(12) United States Patent
Zhang et al.

(10) Patent No.: US 12,348,274 B2
(45) Date of Patent: Jul. 1, 2025

(54) NODE AND METHOD PERFORMED BY THE NODE IN WIRELESS COMMUNICATION SYSTEM

(71) Applicant: Samsung Electronics Co., Ltd., Gyeonggi-do (KR)

(72) Inventors: Zhongfeng Zhang, Beijing (CN); Di Su, Beijing (CN); Peng Lin, Beijing (CN)

(73) Assignee: Samsung Electronics Co., Ltd (KR)

( * ) Notice: Subject to any disclaimer, the term of this patent is extended or adjusted under 35 U.S.C. 154(b) by 49 days.

(21) Appl. No.: 18/400,230

(22) Filed: Dec. 29, 2023

(65) Prior Publication Data
US 2024/0223285 A1    Jul. 4, 2024

(30) Foreign Application Priority Data

Dec. 30, 2022    (CN) .......................... 202211740723.6

(51) Int. Cl.
*H04B 17/10*    (2015.01)
*H04B 17/309*    (2015.01)

(52) U.S. Cl.
CPC ......... *H04B 17/102* (2015.01); *H04B 17/309* (2015.01)

(58) Field of Classification Search
CPC .......................... H04B 17/102; H04B 17/309
See application file for complete search history.

(56) References Cited

U.S. PATENT DOCUMENTS

| | | | |
|---|---|---|---|
| 12,166,603 B2* | 12/2024 | Bashir | H04L 25/0228 |
| 2006/0068709 A1 | 3/2006 | Hafeez | |
| 2010/0285738 A1* | 11/2010 | Howard | H04L 27/2613 455/9 |
| 2014/0293899 A1 | 10/2014 | Ko et al. | |
| 2015/0247915 A1 | 9/2015 | Huang et al. | |
| 2017/0187504 A1 | 6/2017 | Qian et al. | |
| 2020/0379079 A1 | 12/2020 | Dupray et al. | |
| 2024/0223232 A1* | 7/2024 | Lin | H04B 1/525 |
| 2024/0223285 A1* | 7/2024 | Zhang | H04B 17/27 |

OTHER PUBLICATIONS

International Search Report dated Apr. 18, 2024 issued in counterpart application No. PCT/KR2023/021977, 7 pages.

* cited by examiner

*Primary Examiner* — Jaison Joseph
(74) *Attorney, Agent, or Firm* — The Farrell Law Firm, P.C.

(57) ABSTRACT

The disclosure relates to a 5G or 6G communication system for supporting a higher data transmission rate. Disclosed is a method performed by a first node in a wireless communication system including performing channel estimation on an echo signal of a first signal transmitted by the first node, determining a first filter based on a result of the channel estimation and a distance between the first node and a target, and performing a first filtering process on the result of channel estimation based on the first filter.

20 Claims, 12 Drawing Sheets

NODE AND METHOD PERFORMED BY THE NODE IN WIRELESS COMMUNICATION SYSTEM

CROSS-REFERENCE TO RELATED APPLICATION(S)

This application is based on and claims priority under 35 U.S.C. § 119(a) to Chinese Patent Application No. 202211740723.6, which was filed in the China National Intellectual Property Administration on Dec. 30, 2022, the entire content of which is incorporated herein by reference.

TECHNICAL FIELD

The disclosure relates generally to wireless communication technology, and more particularly, to a node and a method performed by the node in a wireless communication system.

BACKGROUND 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Many types of communication devices have been introduced with the advancement of science and technology. In addition to traditional devices such as mobile phones and computers, mobile robots, such as autonomous vehicles and drones, have been introduced. Such mobile devices often need the ability to accurately locate or be accurately located to correctly identify and respond to a current situation, by having positioning capability similar to that in radar technology. For example, a communication device may be equipped with a radar module. However, as a working frequency band of a communication system has risen to a higher frequency band in recent years, the communication frequency band is also gradually approaching the radar frequency band. As a result, interference and resource conflicts between the communication system and the radar system are unavoidable. This problem may be solved by considering a fusion system of communication and radar, which is referred to as communication-sensing integration technology, to further enhance the function of the communication system and improve the spectrum efficiency. At present, communication-sensing integration is regarded as one of the key technologies of future communication systems.

A core concept of the communication-sensing integration is to use the same set of hardware devices to realize a perception function of the ambient environment at the cost of as little resource overhead as possible while ensuring the basic communication functions. In other words, a communication node also has the function of perception, including distance, orientation, velocity, and object type in the ambient environment. Different from the technology of positioning an access terminal in the traditional communication system, the communication-sensing integration technology can also implement sensing of various information of non-access objects, which greatly improves the capability of dynamic adjustment of a working state of the communication system according to the ambient environment (such as scheduling, beam management, and early warning of access terminals).

At present, the most widely used communication systems are based on third generation partnership project (3GPP) protocols, including 4G communication systems such as LTE and LTE-A, and 5G communication systems such as new radio (NR). Signal waveforms used in these communication systems are all orthogonal frequency division multiplexing (OFDM)-based modulated waveforms. Considering forward compatibility, an OFDM communication signal can be used as a sensing signal, including a physical signal that may or may not be used for sensing purposes. For example, when the sensing node is a base station, the sensing signal may be a downlink reference signal or a downlink physical channel, and when the sensing node is a terminal, the sensing signal may be an uplink reference signal or an uplink physical channel. When the sensing node is a road side unit (RSU), the sensing signal may be a sidelink reference signal or a sidelink physical channel. The sensing signal transmitted by a transmitting end is reflected by a target reflector and then received by the transmitting end in the form of an echo. By performing signal processing on an echo signal, sensing information such as the distance, velocity, and orientation of a target object can be sensed. However, since side lobe power of the echo signal of a short-distance sensing target may be higher than main lobe power of the echo signal of a long-distance sensing target, the long-distance sensing target will be missed. Therefore, to effectively suppress the side lobe power of the echo signal of the short-distance sensing target and improve the sensing ability of the long-distance sensing target, the echo signal can be filtered by using a filter in the time domain or frequency domain to suppress the side lobe power of the echo signal of the short-distance sensing target. Although the filtering operation can suppress the power of a side lobe, it will also cause a widening of a main lobe of the echo signal, which detrimentally affects sensing resolution.

As such, there is a need in the art for an improved echo target detection method to ensure that the long-distance echo signal will not be missed while the sensing resolution meets certain conditions.

SUMMARY

The disclosure has been made to address at least the above-mentioned problems and/or disadvantages and to provide at least the advantages described below.

Accordingly, an aspect of the disclosure is to provide an adaptive filter-based echo target detection method using a filter designed based on a window function that effectively suppresses the side lobe power of the echo signal of the sensing target.

Another aspect of the disclosure is to provide a sensing node that adaptively adjusts parameters of the window function and controls a width of the main lobe and an amplitude of the side lobe of the window function.

Another aspect of the disclosure is to provide an echo detection method based on the adaptive window function which improves the sensing resolution of a long-distance target, so that a windowed signal can be used to more accurately sense the physical quantities such as distance, orientation, and velocity of the target.

In accordance with an aspect of the disclosure, a method performed by a first node in a wireless communication system includes performing channel estimation on an echo signal of a first signal transmitted by the first node, determining a first filter based on a result of the channel estimation and a distance between the first node and a target, and performing a first filtering process on the result of channel estimation based on the first filter.

In accordance with an aspect of the disclosure, a first node in a wireless communication system includes a transceiver and a controller, and the controller is configured to execute a method by performing channel estimation on an echo signal of a first signal transmitted by the first node, determining a first filter based on a result of the channel estimation and a distance between the first node and a target, and performing a first filtering process on the result of channel estimation based on the first filter.

BRIEF DESCRIPTION

The foregoing and other aspects, features and advantages of certain embodiments of the present disclosure will become more apparent from the following description with reference to the accompanying drawings, in which.

DETAILED DESCRIPTION

Figure 1:
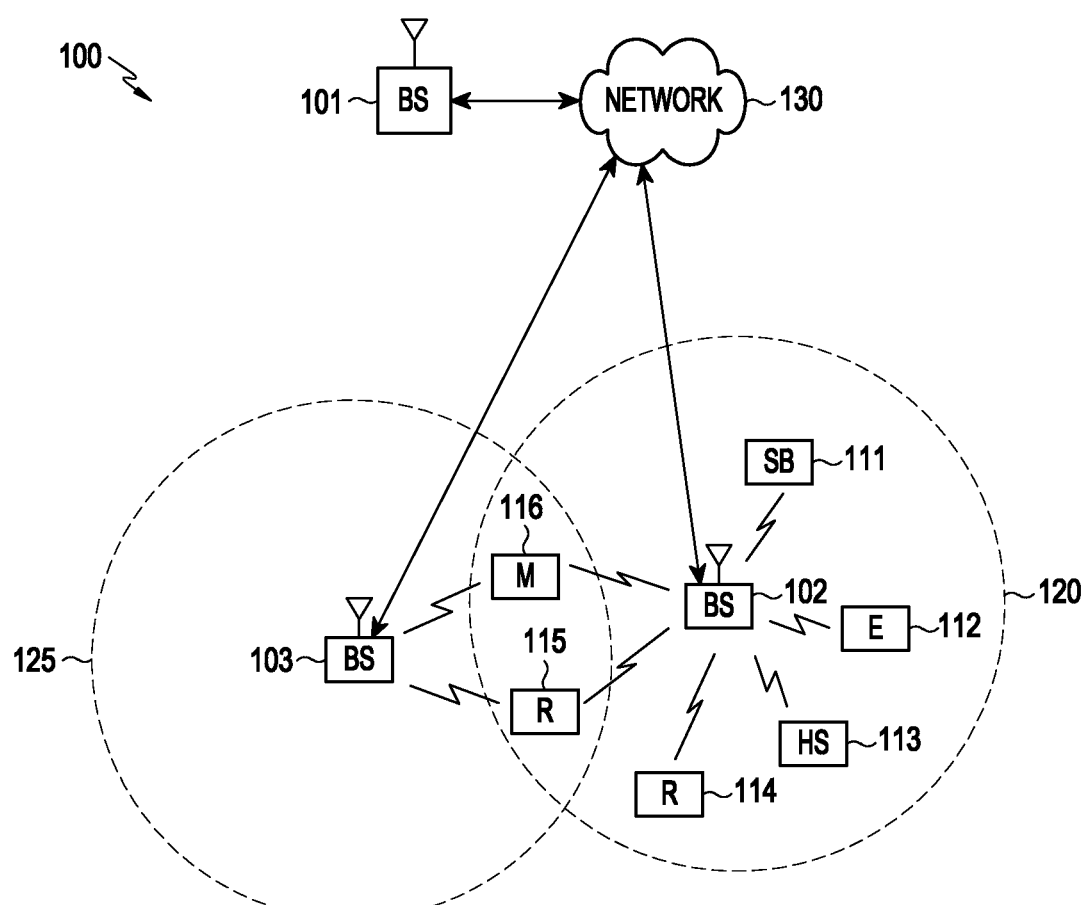
FIG. 1 illustrates a wireless network according to an embodiment.

The following description with reference to the accompanying drawings is provided to assist in a comprehensive understanding of embodiments of the present disclosure. Accordingly, those of ordinary skill in the art will recognize that various changes and modifications of the embodiments described herein can be made without departing from the scope and spirit of the present disclosure. Descriptions of well-known functions and constructions may be omitted for the sake of clarity and conciseness.

The text and drawings are provided as examples only to help readers understand the present disclosure and are not intended to limit the scope of the present disclosure. Although certain embodiments and examples have been provided, based on the content disclosed herein, it is obvious to those skilled in the art that modifications to the illustrated embodiments and examples can be made without departing from the scope of the present disclosure.

Singular forms "a," "an," and "the" include plural referents unless the context clearly dictates otherwise. Thus, reference to "a component surface" includes reference to one or more of such surfaces.

The term "include" or "may include" refers to the existence of a corresponding disclosed function, operation or component which can be used in embodiments of the present disclosure and does not limit one or more additional functions, operations, or components. Terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used herein includes any or all of combinations of listed words. For example, the expression "A or B" may include A or B, or both A and B.

The ordinal numbers "first", "second", etc. used in embodiments of the present disclosure are only used to distinguish one element from another element, and do not concern order or importance.

Unless defined differently, all terms used herein, which include technical terminologies or scientific terminologies, have the same meaning as that understood by a person skilled in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The technical solutions of the embodiments of the present application can be applied to various communication systems, such as global system for mobile communications (GSM) system, code division multiple access (CDMA) system, wideband CDMA (WCDMA) system, general packet radio service (GPRS), long term evolution (LTE) system, LTE frequency division duplex (FDD) system, LTE time division duplex (TDD) system, universal mobile telecommunications system (UMTS), worldwide interoperability for microwave access (WiMAX) communication system, 5G system or NR. In addition, the technical solutions of the embodiments of the present application can be applied to future-oriented communication technologies.

The present disclosure mainly relates to the sensing function of a communication-sensing integration node, referred to as a sensing node and including a base station, a terminal, or a RSU, for example.

FIG. 1 illustrates a wireless network 100 according to an embodiment.

The wireless network 100 includes a gNodeB (gNB) 101, a gNB 102, and a gNB 103. The gNB 101 communicates with gNB 102 and gNB 103. gNB 101 also communicates with at least one Internet protocol (IP) network 130, such as the Internet, a private IP network, or another data network.

Depending on a type of the network, other well-known terms such as base station or access point can be used instead of gNodeB or gNB. For convenience, the terms gNodeB and gNB are used in this patent document to refer to network infrastructure components that provide wireless access for remote terminals. Based on the type of the network, other well-known terms such as mobile station, user station, remote terminal, wireless terminal or user apparatus can be used instead of user equipment or UE. For convenience, the terms user equipment and UE are used herein to refer to remote wireless devices that wirelessly access the gNB, no matter whether the UE is a mobile device such as a mobile phone or a smart phone or a fixed device such as a desktop computer or a vending machine.

A gNB 102 provides wireless broadband access to the network 130 for a first plurality of UEs within a coverage area 120 of gNB 102. The first plurality of UEs include a UE which may be located in a small business (SB) 111, a UE which may be located in an enterprise (E) 112, a UE which may be located in a wireless fidelity (WiFi) hotspot (HS) 113, a UE which may be located in a first residence (R) 114, a UE which may be located in a second residence (R) 115, and a UE which may be a mobile device (M) 116, such as a cellular phone, a wireless laptop computer, a wireless personal data assistant (PDA), etc. The gNB 103 provides wireless broadband access to network 130 for a second plurality of UEs within a coverage area 125 of gNB 103. The second plurality of UEs includes a UE in the R 115 and a UE in the (or M) 116. One or more of gNBs 101-103 can communicate with each other and with UEs in the SB, E, HS, R's or M 111-116 using 5G, long term evolution (LTE), LTE-A, WiMAX or another advanced wireless communication technology.

The dashed lines show approximate ranges of the coverage areas 120 and 125, and the ranges are shown as approximate circles merely for illustration and explanation purposes, the coverage areas associated with the gNBs, such as the coverage areas 120 and 125, may have other shapes, including irregular shapes, depending on configurations of the gNBs and changes in the radio environment associated with natural obstacles and man-made obstacles.

One or more of gNB 101, gNB 102, and gNB 103 include a two-dimensional (2D) antenna array as described herein. One or more OF gNB 101, gNB 102, and gNB 103 support codebook designs and structures for systems with 2D antenna arrays.

Although FIG. 1 illustrates a of the wireless network 100, various changes can be made to FIG. 1. The wireless network 100 can include any number of gNBs and UEs in any suitable arrangement, for example, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or another data network.

Figure 2A:
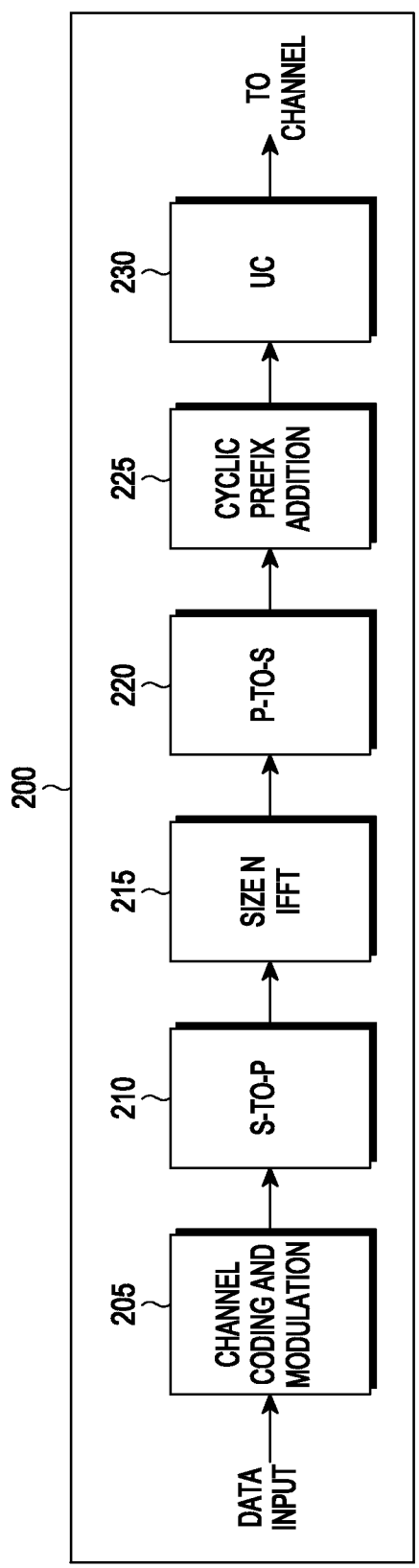
FIG. 2A illustrates wireless transmission and reception paths according to an embodiment.

FIG. 2A illustrates a wireless transmission path according to an embodiment.

The transmission path 200 may be implemented in a gNB, such as gNB 102. However, the transmission path 200 can be implemented in a UE.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230.

Figure 2B:
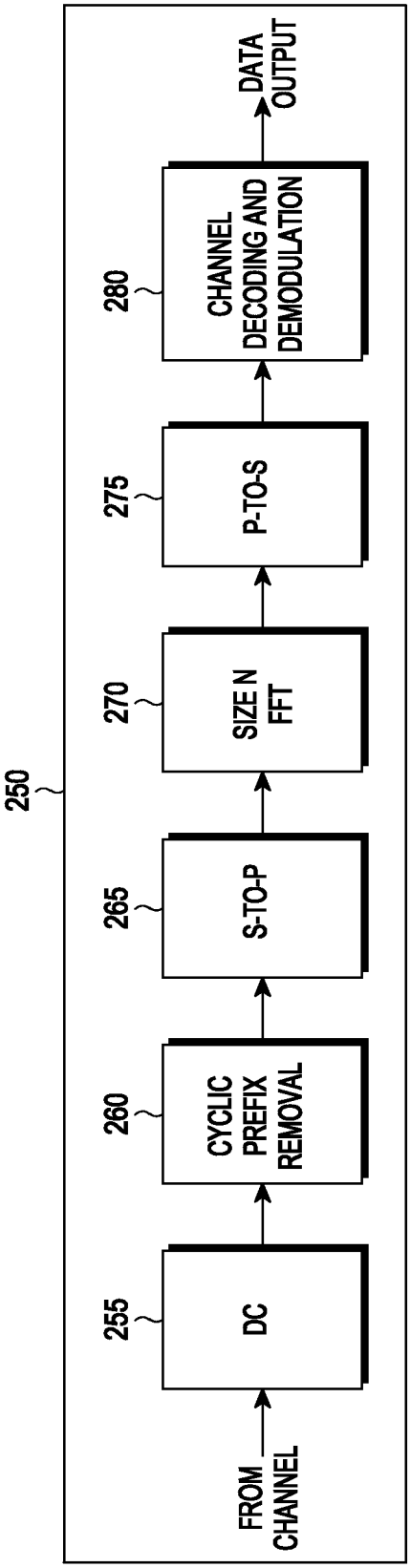
FIG. 2B illustrates wireless transmission and reception paths according to an embodiment.

FIG. 2B illustrates a wireless reception path according to an embodiment. The reception path 250 can be described as being implemented in a UE, such as UE 116. However, it should be understood that the reception path 250 can be implemented in a gNB. The reception path 250 is configured to support codebook designs and structures for systems with 2D antenna arrays as described herein The reception path 250 includes a down-converter (DC) 255, a cyclic prefix removal block 260 an S-to-P block 265, a size N fast Fourier transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as demultiplexes) serial modulated symbols into parallel data to generate N parallel symbol streams, where N is a size of the IFFT/FFT used in the gNB 102 and the UE 300 (see FIG. 3A). The size N IFFT block 215 performs IFFT operations on the N parallel symbol streams to generate a time-domain output signal. The P-to-S block 220 converts (such as multiplexes) parallel time-domain output symbols from the Size N IFFT block 215 to generate a serial time-domain signal. The cyclic prefix addition block 225 inserts a cyclic prefix into the time-domain signal. The UC 230 modulates up-converts) the output of the cyclic prefix addition block 225 to an RF frequency for transmission via a wireless channel. The signal can also be filtered at a baseband before switching to the RF frequency.

The RF signal transmitted from the gNB 102 arrives at UE 300 after passing through the wireless channel, and operations in reverse to those at the gNB 102 are performed at UE 300. The DC 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs in the SB, E, HS, R's or M 111-116 in the downlink and may implement a reception path 250 similar to that for receiving from UEs in the SB, E, HS, R's or M 111-116 in the uplink. Similarly, each of UEs in the SB, E, HS, R's or M 111-116 may implement a transmission path 200 for transmitting to gNBs 101-103 in the uplink and may implement a reception path 250 for receiving from gNBs 101-103 in the downlink.

Each of the components in FIGS. 2A and 2B can be implemented using only hardware or using a combination of hardware and software/firmware. For example, at least some of the components in FIGS. 2A and 2B may be implemented in software, while other components may be implemented in configurable hardware or a combination of software and configurable hardware. For example, the size N FFT block 270 and size N IFFT block 215 may be implemented as configurable software algorithms, in which the value of the size N may be modified according to the implementation.

Although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. FIGS. 2A and 2B are intended to illustrate examples of types of transmission and reception paths that can be used in a wireless network. Any other suitable architecture can be used to support wireless communication in a wireless network.

Figure 3A:
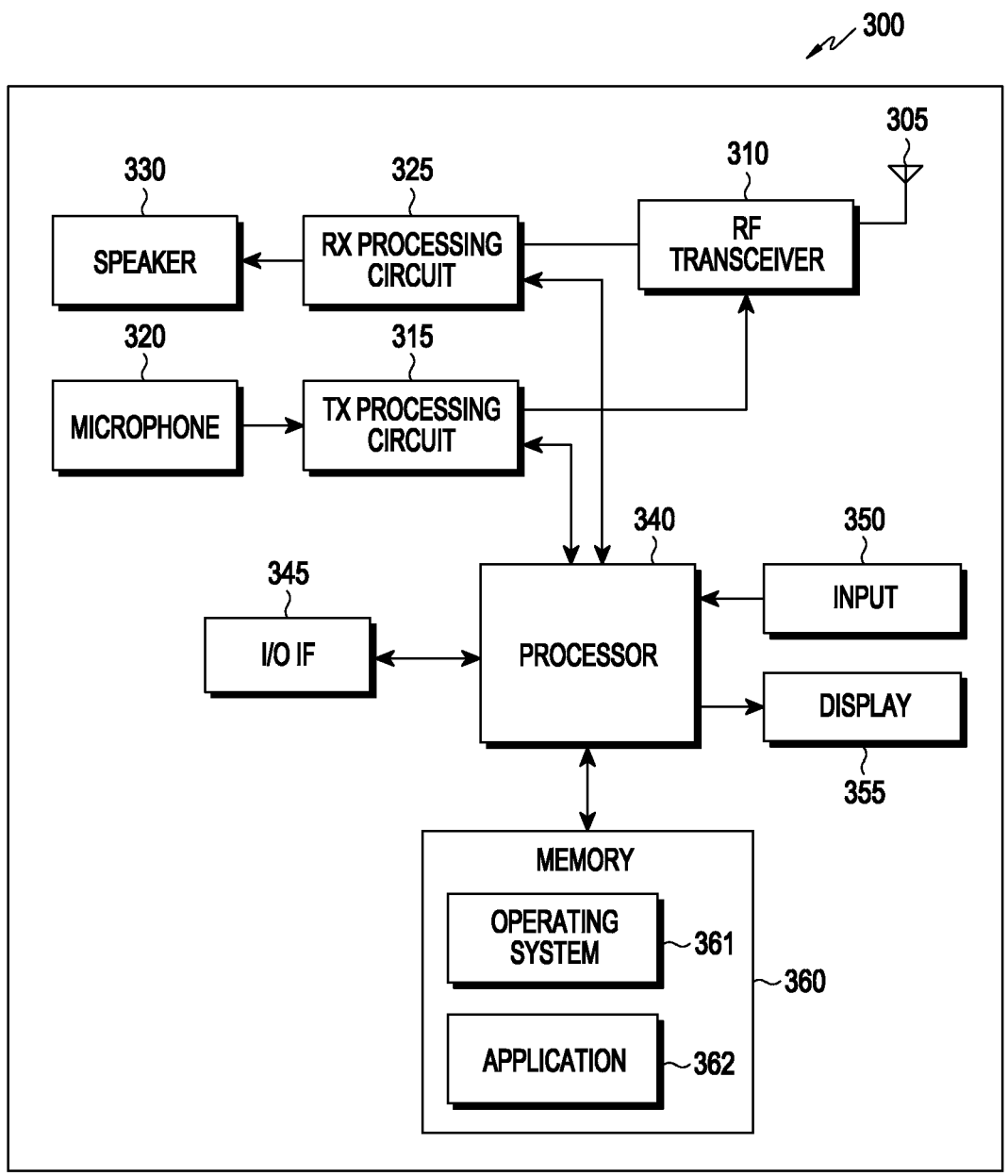
FIG. 3A illustrates a UE according to an embodiment.

FIG. 3A illustrates a UE 300 according to an embodiment. UE 300 shown in FIG. 3A is for illustration only, and UEs in any of the SB, E, HS, R's or M 111-115 of FIG. 1 can have the same or similar configuration. However, a UE has various configurations, and FIG. 3A does not limit the scope of the present disclosure to any specific implementation of the UE.

The UE 300 includes an antenna 305, a radio frequency (RF) transceiver 310, a transmission (TX) processing circuit 315, a microphone 320, a reception (RX) processing circuit 325, a speaker 330, a processor/controller 340, an input/output (I/O) interface 345, an input device(s) 350, a display 355, and a memory 360 including an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 for further processing (such as for web browsing data).

The TX processing circuit 315 receives analog or digital voice data from the microphone 320 or outgoing baseband data such as network data, email or interactive video game data, from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or processing devices and executes an OS 361 stored in the memory 360 in order to control the overall operation of the UE 300. For example, the processor/controller 340 can control the reception of forward channel signals and the transmission of backward channel signals through the RF transceiver 310, the RX processing circuit 325, and the TX processing circuit 315 according to well-known principles. The processor/controller 340 includes at least one microprocessor or microcontroller.

The processor/controller 340 is also capable of executing other processes and programs residing in the memory 360, such as operations for channel quality measurement and reporting for systems with 2D antenna arrays as described herein. The processor/controller 340 can move data into or out of the memory 360 as required by an execution process. The processor/controller 340 is configured to execute the application 362 based on the OS 361 or in response to signals received from the gNB or the operator. The processor/controller 340 is also coupled to an I/O interface 345 which provides UE 300 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of UE 300 can input data into UE 300 using the input device(s) 350. The display 355 may be a liquid crystal display or another display capable of presenting text and/or at least limited graphics (such as from a website). The memory 360 is coupled to the processor/controller 340. A part of the memory 360 can include a random access memory (RAM), while another part of the memory 360 can include a flash memory or a read-only memory (ROM).

UE 300 Components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Although FIG. 3A illustrates that the UE 300 is configured as a mobile phone or a smart phone, UEs can be configured to operate as other types of mobile or fixed devices.

Figure 3B:
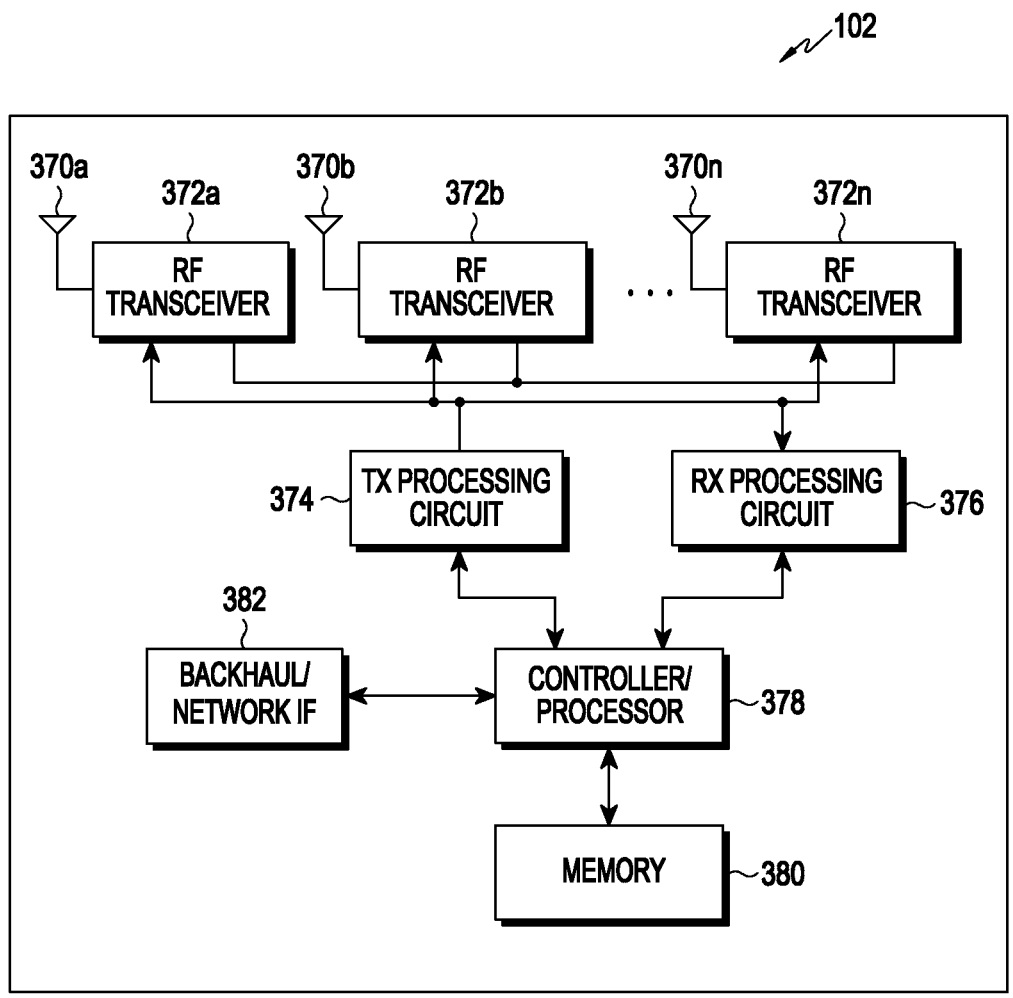
FIG. 3B illustrates a base station (or gNB) according to an embodiment.

FIG. 3B illustrates a gNB 102 according to an embodiment. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. The gNB 101 and the gNB 103 can include the same or similar structures as the gNB 102.

As shown in FIG. 3B, the gNB 102 includes a plurality of antennas 370a-370n, a plurality of RF transceivers 372a-372n, a TX processing circuit 374, and an RX processing circuit 376. One or more of the plurality of antennas 370a-370n may include a 2D antenna array, and gNB 102 also includes a controller/processor 378, a memory 380, and a backhaul or network interface 382.

The RF transceivers 372a-372n receive an incoming RF signal from the antennas 370a-370n, such as a signal transmitted by the UEs or gNBs. The RF transceivers 372a-372n down-convert the incoming RF signal to generate an IF or baseband signal. The IF or baseband signal is transmitted to the RX processing circuit 376 which generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from TX processing circuit 374 and up-convert the baseband or IF signal into an RF signal transmitted via the antennas 370a-370n.

The controller/processor 378 can include one or more processors or processing devices that control the overall operation of the gNB 102. For example, the controller/processor 378 can control the reception of forward channel signals and the transmission of backward channel signals through the RF transceivers 372a-372n, the RX processing circuit 376, and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. The controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described herein. The controller/processor 378 supports communication between entities such as web real-time communications (RTCs). The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network and can support communication over any suitable wired or wireless connection(s). For example, when the gNB 102 is implemented as a part of a cellular communication system, such as a cellular communication system supporting 5G or NR access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or ROMs. A plurality of instructions, such as the BIS algorithm, is stored in the memory and is configured to cause the controller/processor 378 to execute the BIS process and decode the received signal after subtracting at least one interference signal determined by the BIS algorithm.

The transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates a of gNB 102, various changes may be made to FIG. 3B. For example, gNB 102 can include any number of each component shown in FIG. 3A, the access point can include many backhaul or network interfaces 382, and the controller/processor 378 can support routing functions to route data between different network addresses. Although shown as including a single instance of the TX processing circuit 374 and a single instance of the RX processing circuit 376, the gNB 102 can include multiple instances of each (such as one for each RF transceiver).

Figure 4:
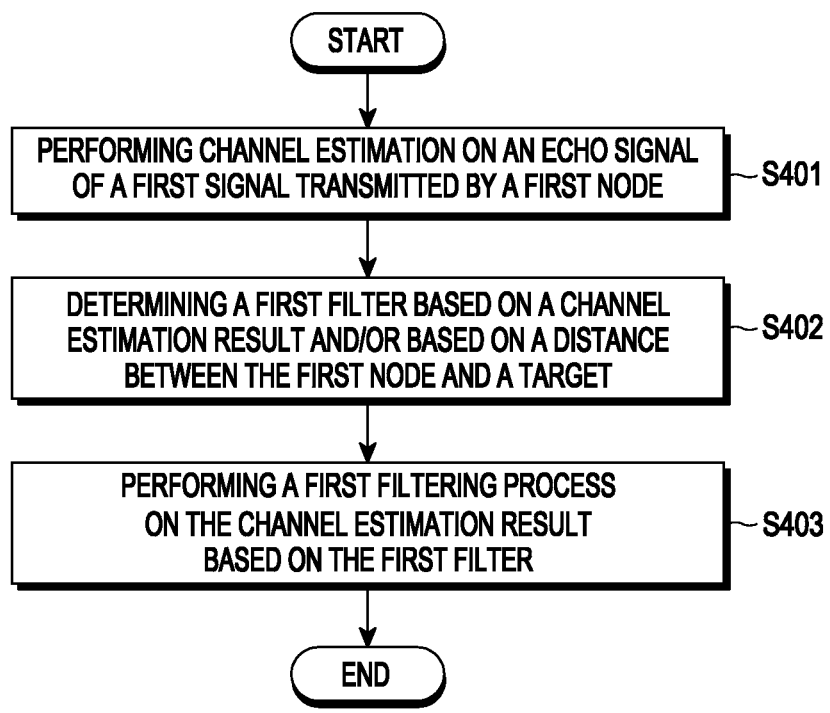
FIG. 4 illustrates a filtering method according to an embodiment.

FIG. 4 illustrates a filtering method according to an embodiment. The method may be performed by a first node in a wireless communication system, and the first node may be a terminal, a base station, an RSU, etc.

In step S401, the first node performs channel estimation on an echo signal of a first signal transmitted by the first node.

In step S402, the first node determines a filter based on a result of channel estimation and/or based on a distance between the first node and a target.

In step S403, the first node performs a first filtering process on the result of channel estimation based on the first filter.

Determining the first filter includes determining a maximum main lobe power of the echo signal based on the result of channel estimation, and determining the first filter based on the maximum main lobe power and a noise power.

Determining the first filter includes determining, based on the result of channel estimation, the maximum main lobe power of the echo signal, a first distance between the first node and a first target corresponding to the maximum main lobe power, a minimum main lobe power of the echo signal, and a second distance between the first node and a second target corresponding to the minimum main lobe power, and determining the first filter based on the maximum main lobe power, the first distance, the minimum main lobe power, the second distance, and the noise power.

The distance between the first node and the target is determined based on the result of channel estimation or is received from a second node.

The different distances correspond to different filters, or a plurality of the different distances correspond to a same filter.

The method may further include transmitting, to the second node, a distance between the second node and the target.

The method may further include performing a second filtering process on the result of channel estimation based on a filter used by the first node in at least one previous sensing cycle. When the result of channel estimation after the second filtering process and channel estimation after the first filtering process in the at least one previous sensing cycle satisfy a first condition, the filter is determined based on the result of channel estimation and/or the distance between the first node and the target.

The method may further include receiving, from the second node, third configuration information for configuring a sensing cycle of the first node.

The method may further include transmitting, to the second node, fourth configuration information for configuring a sensing cycle of the second node.

The noise power is preconfigured (for example, determined according to an empirical value or a theoretical value), or is estimated based on a received signal of the first node including an echo signal.

Determining the filter includes performing a third filtering process on the result of channel estimation by using second filter configured, and determining the filter based on the result of channel estimation after the third filtering process and/or based on the distance between the first node and the target.

The method may further include transmitting, to the second node, the first object detection result of the first node.

The first node and the second node are one of: a terminal, a base station and an RSU.

Figure 5:
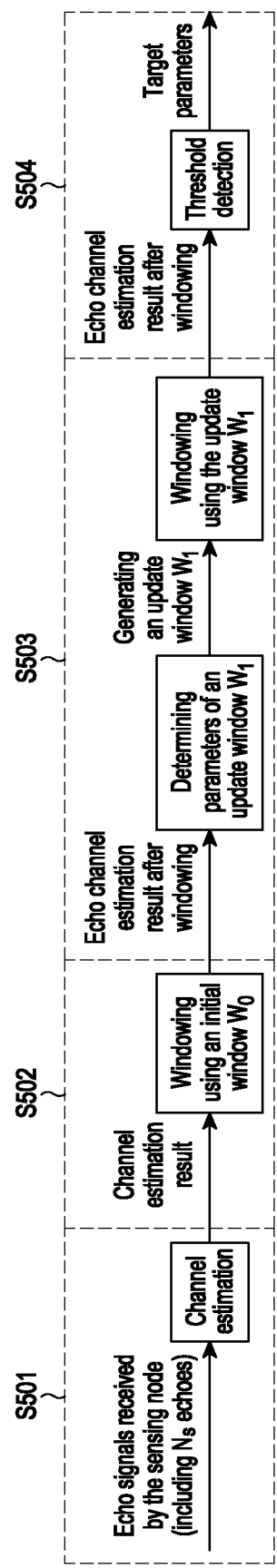
FIG. 5 illustrates a flowchart of a method performed by a node according to an embodiment.

FIG. 5 illustrates a flowchart of a method performed by a node according to an embodiment. Specifically, FIG. 5 illustrates an echo target detection method based on an adaptive window function (hereinafter referred to as Method 1). In FIG. 5, a channel estimation and/or Doppler estimation result is obtained by receiving and processing an echo signal of a sensing signal transmitted by a sensing node, and a window function processing (hereinafter windowing) is adaptively applied to the result to determine sensing information including the absence or existence of a sensing target, the number of sensing targets, the distance between each sensing target and the sensing node, the (radical) velocity of each sensing target, etc.

In step S501, the sensing node transmits a single sensing signal or multiple sensing signals, receives an echo signal of a sensing signal, and performs channel estimation based on the echo signal to obtain an estimation result. The sensing node may transmit a single sensing signal or multiple sensing signals, and the single sensing signal or multiple sensing signals may be transmitted to a specific sensing region. An implementation mode of transmitting to a specific sensing region may be a single sensing signal or multiple sensing signals transmitted by using a same transmit beam. Moreover, transmitting the single sensing signal or multiple sensing signals may include transmitting sensing signals of a same sequence once or multiple times (for example, transmitting repeatedly), or transmitting sensing signals of a same length but different sequences once or multiple times.

When the sensing node transmits a single sensing signal, the sensing node receives an echo time-domain signal of the single sensing signal and performs channel estimation on the signal to obtain a result of channel estimation thereof. Channel estimation may be frequency-domain channel estimation or time-domain channel estimation. In an existing system (such as LTE, NR, etc.), the frequency-domain channel estimation is the most widely used. A channel estimation is described below based on the frequency-domain channel estimation of the least square criterion. A time-domain signal of a single echo on a single OFDM symbol received by the sensing node can be denoted as y[n], n=1, 2, . . . , $N_{FFT}$, and the signal y[n] is subjected to Fourier transform of the number of points $N_{FFT}$, to obtain a frequency-domain signal of the single echo, denoted as Y[k], k=1, 2, . . . , $N_{FFT}$, then a frequency-domain result of channel estimation based on the least square criterion is H[k]=Y[k]/S[k], k=1, 2, . . . , $N_{FFT}$, where S[k], k=1, 2, . . . , $N_{FFT}$ is a frequency-domain sequence of the sensing signal. inverse Fourier transform is performed on the frequency-domain result of channel estimation H[k], and a time-domain result of channel estimation of the single echo, i.e., h[n], n=1, 2, . . . , $N_{FFT}$ can be obtained. The channel estimation method is not limited to the least square criterion, and other channel estimation methods can be used. For example, minimum mean square estimation, linear minimum mean square estimation, or maximum likelihood estimation, may be used.

When the sensing node transmits multiple sensing signals, the sensing node stores the received echo signals in a two-dimensional matrix (hereinafter a two-dimensional echo signal), where a time dimension of a single echo signal serves as one dimension of the two-dimensional matrix (short-time processing dimension, that is, the time dimension within a single sensing signal, hereinafter a first dimension), the number of times that echo signals are received is the other dimension of the two-dimensional matrix, i.e., a long-time processing dimension or the dimension of the number of sensing signals, hereinafter a second dimension.

In the first dimension, an echo signal processing method is the same as the echo signal processing method when the sensing node transmits a single sensing signal. In the second dimension, a Doppler result of channel estimation can be obtained by performing Fourier transform of $N_s$ points on the time-domain result of channel estimation of multiple echoes, where $N_s$ is the number of sensing signals transmitted by the sensing node. Similarly, the channel estimation based on the two-dimensional echo signal can also be performed in frequency domain or time domain, that is, the frequency-domain channel estimation or the time-domain channel estimation. When the sensing node transmits $N_s$ sensing signals to a certain sensing region, where $N_s > 1$, and performs a first-dimension frequency-domain channel estimation and a second-dimension Doppler channel estimation on the received $N_s$ echo signals as an example, an implementation of the channel estimation based on the two-dimensional echo signal may be that a first-dimension frequency-domain expression of a single sensing signal transmitted by the sensing node can be denoted as $S[k]$, $k=1, 2, \ldots, N_{FFT}$, where $N_{FFT}$ is the number of sampling points of the single sensing signal transmitted by the sensing node, and is also a length of a first-dimension time-domain/frequency-domain result of channel estimation, and the number of points of Fourier transform/inverse Fourier transform between the first-dimension time domain and frequency domain. A time-domain signal of an l'-th echo received by the sensing node can be denoted as $y[l', n]$, $n=1, 2, \ldots, N_{FFT}$, where $l'=1, 2, \ldots, N_s$. Then, the time-domain signal of the l'-th echo is subjected to Fourier transform of the number of points $N_{FFT}$, a first-dimension frequency-domain signal of the l'-th echo can be obtained, denoted as $Y[l', k]$, $k=1, 2, \ldots, N_{FFT}$, and the frequency-domain result of channel estimation of the l'-th echo is $H[l', k]=Y[l', k]/S[k]$, $k=1, 2, \ldots, N_{FFT}$. Inverse Fourier transform is performed on the frequency-domain result of channel estimation $H[l', k]$ to obtain the first-dimension time-domain result of channel estimation of the l'-th echo, $h[l', n]$, $n=1, 2, \ldots, N_{FFT}$, a second-dimension time-domain expression of an echo signal at an n'-th sampling point can be denoted as $h[l, n']$, $l=1, 2, \ldots, N_s$, and the Fourier transform of $N_s$ points of the second dimension is performed on $h[l, n']$, $l=1, 2, \ldots, N_s$ to obtain the time domain and Doppler domain result of channel estimations, denoted as $H_{TD}[m, n]$, where $m=1, 2, \ldots, N_s$, $n=1, 2, \ldots, N_{FFT}$. In the process of receiving multiple sensing echo signals and performing first-dimension and second-dimension channel estimation on the signals by the sensing node, an order of the first-dimension processing and the second-dimension processing of the sensing echo signals can be changed since the signal processing in the two dimensions is independent of each other.

In step S502, the sensing node uses a first window function (hereinafter an initial window) to perform windowing on the first-dimension and/or second-dimension result of channel estimations.

An implementation of generating the initial window may be to determine parameters of a predetermined window function according to empirical values or theoretical values and generate an initial window sequence. For example, a value of side lobe attenuation $\alpha$ is determined based on the empirical values to generate an initial window sequence $w_0$, such as, $\alpha=100$ dB. Alternatively, according to a minimum sensible distance $r_{min}$ and a maximum sensible distance $r_{max}$ of the sensing node, an echo power ratio of a shortest distance to a furthest distance in free space can be calculated in Equation (1) as follows, $$\rho = 40 \log\left(\frac{r_{max}}{r_{min}}\right) \text{ (in decibels (dB))} \quad (1)$$

where $\rho$ is used as a reference parameter for generating the initial window sequence $w_0$. Taking a Kaiser window as the initial window as an example, generating the initial window sequence $w_0$ may involve the echo power ratio $\rho$ being used as the minimum value of the side lobe attenuation $\alpha$ of the initial window $\alpha \geq \rho$, and according to the side lobe attenuation $\alpha$, a value of the parameter $\beta$ used to generate the Kaiser window function can be obtained. Specifically, the function expression of the Kaiser window is shown in Equation (2) as follows, $$w[n] = \frac{I_0\left(\beta\sqrt{1-\left(\frac{n-\frac{N}{2}}{\frac{N}{2}}\right)^2}\right)}{I_0(\beta)}, n = 1, \ldots, N. \quad (2)$$

In Equation (2), N is a length of the result of channel estimation, $I_0$ is a first type of modified zero-order Bessel function, and $\beta$ is a parameter that can control the side lobe attenuation $\alpha$. For example, the side lobe attenuation $\alpha$ (in dB) and the parameter $\beta$ can have a relationship as shown below in Equation (3).

$$\beta = \begin{cases} 0.1102(\alpha - 8.7), & \alpha > 50 \\ 0.5842(\alpha - 21)^{0.4}, & 21 \leq \alpha \leq 50 \\ 0, & \alpha < 21 \end{cases} \quad (3)$$

According to the relationship between the attenuation $\alpha$ and the parameter $\beta$ described above, the parameter $\beta$ can be obtained. The advantage of generating the initial window sequence $w_0$ in this manner is to greatly reduce the influence of an echo side lobe of a sensing target A at a short distance and/or have a high radar cross section on an echo main lobe of a target B at a long distance and/or in a low Radar cross section, so that the sensing target at a long distance can also be detected. The initial window sequence $w_0$ can be selected as any window function that has the effect of suppressing the side lobe power. As an example, the predetermined window function can be a Kaiser window or a Chebyshev window, in which the Kaiser window controls the attenuation of the side lobe and the width of the main lobe by adjusting the parameter $\beta$, and the Chebyshev window can minimize the width of the main lobe under the condition of a given side lobe height.

When the sensing node only receives a single sensing echo signal on a single OFDM symbol, the sensing node may generate an initial window $W_0[k]$, $k=1, 2, \ldots, N_{FFT}$ of a length $N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. The first-dimension frequency-domain result of channel estimation of the single echo $H[k]$, $k=1, 2, \ldots, N_{FFT}$ is multiplied with the sampling point corresponding to the initial window sequence $W_0[k]$, $k=1, 2, \ldots, N_{FFT}$ to obtain the result of channel estimation after windowing of the first-dimension frequency domain, i.e., $H_{w0}[k]=H[k]\cdot W_0[k]$, $k=1, 2, \ldots, N_{FFT}$. Another implementation of using the initial window for windowing may be to generate an initial window sequence $W_0[k]$, $k=1, 2, \ldots, N_{FFT}$ of a length $N_{FFT}$, and perform inverse Fourier transform of $N_{FFT}$ points on the window function sequence to obtain a time-domain expression of the initial window sequence $w_0[n]$, $n=1, 2, \ldots, N_{FFT}$ of the length $N_{FFT}$, and then the first-dimension time-domain result of channel estimation of the single echo $h[n]$, $n=1, 2, \ldots, N_{FFT}$ is convolved with the time-domain expression $w_0[n]$ of the initial window sequence to obtain the result of channel estimation after windowing of the first-dimension time domain of the single echo, i.e., $h_{w0}[n]=h[n]\circledast w_0[n]$, $n=1, 2, \ldots, N_{FFT}$, where $\circledast$ represents a convolution operation.

When the sensing node receives multiple sensing echo signals on multiple OFDM symbols, using the initial window to perform windowing involves two-dimensional processing of the first dimension and the second dimension, wherein windowing may be performed on the result of channel estimation of each of the received multiple sensing echo signals based on the same window sequence (for example, the first initial window sequence). For example, in the first dimension, the sensing node generates a first initial window sequence $W_0^1[k]$, $k=1, 2, \ldots, N_{FFT}$ of the length $N_{FFT}$, and then multiplies the frequency-domain result of channel estimation $H[l', k]$, $k=1, 2, \ldots, N_{FFT}$ of an l'-th (l'=1, 2, \ldots, $N_s$) echo signal with the first initial window sequence $W_0^1[k]$, $k=1, 2, \ldots, N_{FFT}$ to obtain the result of channel estimation of the l'-th echo signal after windowing of the first-dimension frequency domain, i.e., $H_{w0}^1[l', k]=H[l', k]\cdot W_0^1[k]$, $k=1, 2, \ldots, N_{FFT}$, wherein, $N_s$ is the number of sensing signals transmitted by the sensing node, $N_{FFT}$ is the number of sampling points of a single echo, and is also the length of the first-dimension time-domain/frequency-domain result of channel estimation, and the number of points of the Fourier transform/inverse Fourier transform between the first-dimension time domain and frequency domain. The inverse Fourier transform of the frequency domain channel estimation $H_{w0}^1[l, k]$ applied with windowing is the time-domain result of channel estimation $h_{w0}^1[l, n]$. Optionally, another exemplary implementation of using the initial window to perform windowing in the first dimension may be to generate a first initial window sequence $W_0^1[k]$, $k=1, 2, \ldots, N_{FFT}$ of the length $N_{FFT}$, and perform inverse Fourier transform of $N_{FFT}$ points on the window function sequence to obtain a time-domain expression of the first initial window sequence $w_0^1[n]$, $n=1, 2, \ldots, N_{FFT}$ of the length $N_{FFT}$. The first-dimension time-domain result of channel estimation of the l'-th (l'=1, 2, \ldots, $N_s$) echo signal is then convolved, i.e., $h[l', n]$, $n=1, 2, \ldots, N_{FFT}$, with the time-domain expression of the first initial window sequence $w_0^1[n]$, $n=1, 2, \ldots, N_{FFT}$ to obtain the time-domain result of channel estimation after performing windowing on the first dimension of the l'-th (l'=1, 2, \ldots, $N_s$) echo signal, i.e., $h_{w0}^1[l', n]=h[l', n]\circledast w_0^1[n]$, $n=1, 2, \ldots, N_{FFT}$. The result of channel estimation after performing windowing on the first dimension of the $N_s$ echoes is obtained after the $N_s$ echo signals are processed in the first dimension as previously described. Windowing in the second dimension may be performed by generating a second initial window sequence $w_0^2[n]$, $n=1, 2, \ldots, N_s$ of a length $N_s$, where $N_s$ is the number of sensing signals transmitted by the sensing node, and is also the number of points for Fourier transform/inverse Fourier transform between the second-dimension time domain and the Doppler domain. Then, the second-dimension time-domain result of channel estimation $h[l, n']$, $l=1, 2, \ldots, N_s$ of the echo signal at an n'-th (n'=1, 2, \ldots, $N_{FFT}$) sampling point is multiplied with the second initial window sequence $w_0^2[l]$, $l=1, 2, \ldots, N_s$, to obtain the result of channel estimation after windowing of the second-dimension time domain of the echo signal at the n'-th sampling point, i.e., $h_{w0}^2[l, n']=h[l, n']\cdot w_0^2[l]$, $l=1, 2, \ldots, N_s$. Fourier transform of $N_s$ points is performed on the result of channel estimation $h_{w0}^2[l, n']$ after windowing of the second-dimension time domain of the echo signal, and the Doppler-domain result of channel estimation $H_{D\_w0}[m, n]$ after windowing can be obtained, where $m=1, 2, \ldots, N_s$, $n=1, 2, \ldots, N_{FFT}$. Optionally, another exemplary implementation of using the initial window to perform windowing in the second dimension may be to generate a second initial window sequence $w_0^2[n]$, $n=1, 2, \ldots, N_s$ of the length $N_s$. Fourier transform of $N_s$ points is performed on the window function sequence to obtain the Doppler domain expression of the second initial window sequence of the length $N_s$, i.e., $W_0^2[m]$, $m=1, 2, \ldots, N_s$. Subsequently, the second-dimension Doppler result of channel estimation of the echo signal at the n'-th sampling point, $H_D[m, n']$, $m=1, 2, \ldots, N_s$, is convolved with the Doppler domain expression of the second initial window sequence, $W_0^2[m]$, $m=1, 2, \ldots, N_s$, to obtain the result of channel estimation after windowing of the second-dimension Doppler domain of the echo signal at the n'-th sampling point, i.e., $H_{D\_w0}[m, n']=H_D[m, n']\circledast(W_0^2[m])$, $m=1, 2, \ldots, N_s$. The result of channel estimation after windowing of the $N_{FFT}$ echoes is obtained after the echo signals at $N_{FFT}$ sampling points are subjected to the above 2D processing. In the process of obtaining the windowed first-dimension and/or second-dimension result of channel estimations by the sensing node, the sequence of the first-dimension windowing and the second-dimension windowing of the sensing echo signal can be exchanged, and the window function and/or window function-related parameters of the first dimension and the second dimension can be selected independently since the signal processing in the two dimensions is independent of each other. This design increases flexibility of the window functions, and the same or different window functions can be selected for windowing operation according to system design and scenario requirements. The windowing process can also be expressed by simultaneously using the initial window in the first dimension and the second dimension. The frequency-domain result of channel estimation of the $N_s$ echo signals is expressed as a matrix $$H = \begin{bmatrix} H_{11} & \cdots & H_{1N_{FFT}} \\ \vdots & \ddots & \vdots \\ H_{N_S 1} & \cdots & H_{N_S N_{FFT}} \end{bmatrix},$$

where a matrix size is $N_s \times N_{FFT}$. Each row of matrix H represents the result of channel estimation of a single sensing echo signal on a single OFDM symbol, and each column represents the result of channel estimation of the echo signal corresponding to a single sampling point. The first initial window sequence of the length $N_{FFT}$ generated by the sensing node is expressed as a column vector $w^1=[w_1^1, w_2^1, \ldots, w_{N_{FFT}}^1]^T$, and the second initial window sequence of the length $N_s$ is expressed as a vector $w^2=[w_1^2, w_2^2, \ldots, w_{N_s}^2]^T$. The result of channel estimation after windowing can be expressed as a matrix $H_w = F H \odot W_0^1 F^* \odot W_0^2$, where $\odot$ is Hadamard product operation, Fourier transform operation matrix $$F = \begin{bmatrix} 1 & 1 & 1 & \cdots & 1 \\ 1 & \omega^{-1} & \omega^{-2} & \cdots & \omega^{-(N_{FFT}-1)} \\ 1 & \omega^{-2} & \omega^{-4} & \cdots & \omega^{-2(N_{FFT}-1)} \\ \vdots & \vdots & \vdots & \ddots & \vdots \\ 1 & \omega^{-(N_{FFT}-1)} & \omega^{-2(N_{FFT}-1)} & \cdots & \omega^{-(N_{FFT}-1)(N_{FFT}-1)} \end{bmatrix},$$

inverse Fourier transform operation matrix $F^* = \dfrac{1}{N_{FFT}}$ $$\begin{bmatrix} 1 & 1 & 1 & \cdots & 1 \\ 1 & \omega & \omega^2 & \cdots & \omega^{(N_{FFT}-1)} \\ 1 & \omega^2 & \omega^4 & \cdots & \omega^{2(N_{FFT}-1)} \\ \vdots & \vdots & \vdots & \ddots & \vdots \\ 1 & \omega^{(N_{FFT}-1)} & \omega^{2(N_{FFT}-1)} & \cdots & \omega^{(N_{FFT}-1)(N_{FFT}-1)} \end{bmatrix},$$ where $\omega = e^{\frac{2\pi i}{N_{FFT}}}$, the first-dimension window function matrix is $W_0^1 = [w^1, w^1, \ldots, w^1]^T$, the matrix size is $N_s \times N_{FFT}$, the second-dimension window function matrix is $W_0^2 = [w^2, w^2, \ldots, w^2]$, and the matrix size is $N_s \times N_{FFT}$.

The initial window is used to suppress the side lobe power of the sensing target as much as possible and resist a near-far effect, so that the target point will not be missed. Moreover, based on a received signal received by a receiver of the sensing node, where the received signal is an echo signal including a noise signal, when performing noise power estimation, due to the reduction of the side lobe power, the influence of the side lobe power on the noise power estimation will weaken. A noise power estimate will be closer to an actual noise power, and the noise power estimate will serve as an important reference parameter for subsequent operations.

In step S503, the sensing node adaptively adjusts and generates a second window function (hereinafter an update window) according to the result of channel estimation after windowing of the initial window and performs windowing on the result of channel estimation of the first dimension and/or the second dimension.

Figure 6:
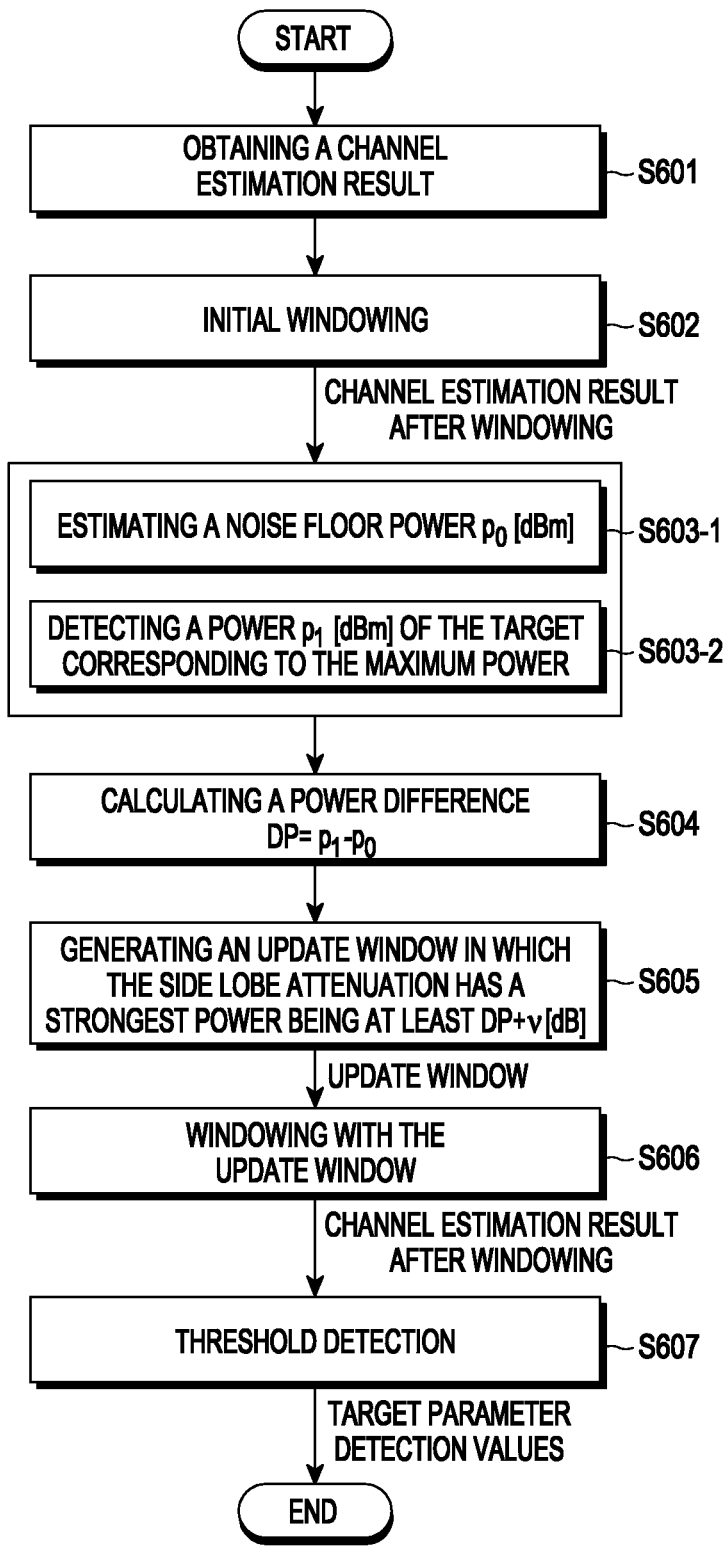
FIG. 6 illustrates a method performed by a node according to an embodiment.

FIG. 6 illustrates a method of adaptively adjusting and generating a window function according to an embodiment. The update window is determined according to the maximum power value and the noise estimate of the result of channel estimation after windowing.

In step S601, the sensing node obtains a result of channel estimation.

In step S602, the sensing node performs windowing on the result of channel estimation to obtain a result of channel estimation after windowing of an initial window.

In step S603, the sensing node estimates a noise floor power $p_0$ (step S603-1) and detects a maximum main lobe power $p_1$ of the target corresponding to the maximum power (step S603-2) according to the result of channel estimation after windowing of the initial window, so as to determine a sensing target A corresponding to the maximum main lobe power $p_1$.

In step S604, the sensing node calculates a difference DP between the noise estimate $p_0$ and the maximum main lobe power $p_1$ of the sensing target A to generate an update window.

In step S605, the sensing node generates an update window in which the side lobe attenuation has a strongest power being at least DP+v, where v is a variable that can be set, to reduce the influence of coherent superposition of multiple echoes. The update window can reduce the side lobe power of the sensing target A corresponding to the maximum power $p_1$ to be below the noise estimate $p_0$, thereby reducing the influence of the side lobe power of a sensing target with a high main lobe power on a sensing target with a low main lobe power, to improve the sensing ability of the sensing node for the sensing target with the low main lobe power.

In step S606, the sensing node performs update windowing on the result of channel estimation obtained in step S601.

In step S607: the sensing node performs a threshold detection on the result of channel estimation after the update windowing, to obtain target parameter detection values. The target parameter detection value may be a distance or a velocity but is not limited thereto.

When the sensing node receives a single sensing echo signal on a single OFDM symbol or multiple sensing echo signals on multiple OFDM symbols, according to the result of channel estimation after the initial windowing, adaptively adjusting the parameters of the window function to generate an update window may be performed by comparing the first-dimension result of channel estimation after the initial windowing with a power threshold value $\delta_1$, and performing a maximum value search in an area exceeding the threshold value $\delta_1$. The number of maximum values searched is the number of detected sensing targets $N_1$, and the generation parameter of the update window sequence $w_1$ can be determined by the highest main lobe peak in the sensing target, that is, the greatest value among the $N_1$ maximum values, where the power threshold value $\delta_1$ can be selected as an empirical value, and the selection of the power threshold value $\delta_1$ will affect the accuracy of estimation of the number of sensing targets. Specifically, assuming that the maximum values corresponding to the $N_1$ sensing targets can be written as $p_i$, $i=1, 2, \ldots, N_1$, and the $N_1$ maximum values can constitute a sensing target set $P_{col} = U_{i=1}^{N_1} p_i$, the greatest value of the $N_1$ maximum values is defined as the highest main lobe peak $p_1$, where $p_1 = \max(P_{col})$. The side lobe attenuation $\alpha$ (in dB) of the update window sequence $w_1$ should satisfy $\alpha \geq p_1 - p_0 + v$, where, $p_0$ is the noise power estimate based on the received signal received by the receiver of the sensing node, v (in dB) is a variable that can be set, and its typical value is 0, the advantage of defining the variable that can be set v is at least to prevent detection of false targets due to the coherent superposition of multiple echoes exceeding the detection threshold. The design advantage of determining the generation parameter $\beta$ of the update window sequence $w_1$ limits complexity of the window sequence, and the generated update window can suppress the side lobe power of the sensing target with high main lobe power to be less than the noise power, so that the sensing node can detect sensing targets with low main lobe power, and the influence of a reduction in sensing resolution of the sensing node due to the use of an initial window with a large side lobe attenuation is weakened. The main application scenarios of this method may be to distinguish targets such as large cars and airplanes, but is not limited thereto.

Figure 7:
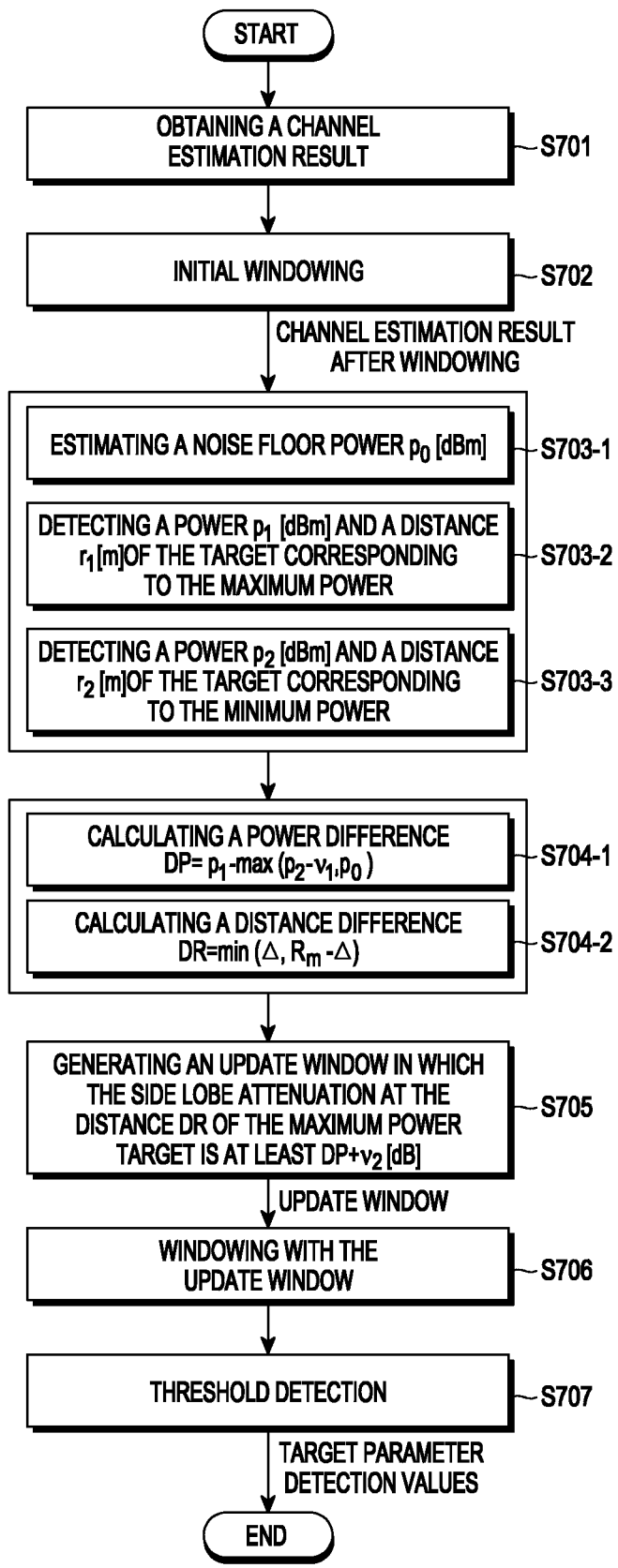
FIG. 7 illustrates a method performed by a node according to an embodiment.

FIG. 7 illustrates a method of adaptively adjusting and generating a window function according to an embodiment. An update window is determined according to the maximum power value of the windowed result of channel estimation and its corresponding distance, the minimum power value and its corresponding distance, and the estimated noise value.

In step S701, the sensing node obtains a result of channel estimation.

In step S702, the sensing node performs windowing on the result of channel estimation to obtain a result of channel estimation after windowing of the initial window.

The sensing node estimates a noise floor power $p_0$ according to the result of channel estimation after windowing of the initial window in step S703-1, detects the maximum main lobe power $p_1$, and a distance $r_1$ of the sensing target for detecting a sensing target A in step S703-2, and detects the minimum main lobe power $p_2$, and a distance $r_2$ of the sensing target for detecting a sensing target B in step S703-3.

The sensing node calculates a power difference DP in step S704-1 and calculates a distance difference DR in step S704-2 to generate an update window, based on the main lobe power $p_1$, the distance of the sensing target A $r_1$, the minimum main lobe power $p_2$, and the distance of the sensing target B $r_2$. For example, the power difference DP can be calculated by $DP=p_1-\max(p_2-v_1, p_0)$, where $v_1$ a variable that can be set to reduce the influence of coherent superposition of multiple echoes, and the distance difference DR can be calculated by $DR=\min(\Delta, Rm-\Delta)$.

In step S705, the sensing node generates an update window in which the side lobe attenuation at the distance DR of the maximum power target point is at least $DP+v_2$, where $v_2$ is a variable that can be set to reduce the influence of coherent superposition of multiple echoes. The update window can reduce the side lobe power of the sensing target A corresponding to the maximum main lobe power to be less than the main lobe power of the sensing target B corresponding to the minimum main lobe power value, thereby reducing the influence of the side lobe power of a sensing target with a high main lobe power on the sensing target with a low main lobe power, to improve the sensing ability of the sensing node for the sensing target with the low main lobe power.

In step S706, the sensing node performs update windowing on the result of channel estimation obtained in step S701.

In step S707, the sensing node performs a threshold detection on the result of channel estimation after the update windowing, to obtain target parameter detection values.

When the sensing node receives a single sensing echo signal on a single OFDM symbol or multiple sensing echo signals on multiple OFDM symbols, according to the result of channel estimation after windowing of the initial window, another specific implementation of adaptively adjusting the parameters of the window function to generate an update window may be to compare the first-dimension result of channel estimation after the windowing of the initial window with a power threshold value $\delta_1$, and perform a maximum value search in a region exceeding the threshold value $\delta_1$. The number of maximum values searched is the number of detected sensing targets $N_1$, and the generation parameter of the update window sequence $w_1$ can be determined by the highest main lobe peak in the sensing target, that is, a greatest value and a least value among the $N_1$ maximum values as well as corresponding distances, where the power threshold value $\delta_1$ can be selected as an empirical value, and selection of the power threshold value $\delta_1$ will affect accuracy of estimation of the number of sensing targets. Specifically, assuming that the maximum values corresponding to the $N_1$ sensing targets can be expressed as $p_i$, $i=1, 2, \ldots, N_1$, and the $N_1$ maximum values can constitute a sensing target set $P_{col}=U_{i=1}^{N_1}p_i$. The greatest value of the $N_1$ maximum values is defined as the highest main lobe peak $p_1=\max(P_{col})$, and its corresponding sampling point is $t_1$, according to Equation (4) as follows, $$r = \frac{t_1 \cdot c}{2 \cdot F_s} \text{ (in } m\text{)} \quad (4)$$

where $F_s$ is a sampling rate, and c is a velocity of light, the distance r of the sensing target with the highest peak value $p_1$ can be calculated. Similarly, the minimum main lobe peak $p_2=\min(P_{col})$ in the sensing target set $P_{col}$ can be calculated, and the corresponding distance of the sensing target is $r_2$. The power difference $DP=p_1-\max(p_2-v_1, p_0)$ is calculated, where $v_1$ (in dBm) is a variable that can be set, and has a value range greater than 0, and the distance difference $DR=\min(\Delta, R_m-\Delta)$ is calculated, where $\Delta=|r_2-r_1|$, $R_m$ is a maximum distance in meters (m) that the sensing node can sense. The update window sequence $w_1$ should satisfy the side lobe attenuation at the distance $r_1+DR$ being $\alpha \geq DP+v_2$ (in dB), where $v_2$ (in dB) is a variable that can be set, and its typical value is 0. An advantage of defining the variable $v_2$ that can be set is to prevent the detection of false targets due to the coherent superposition of multiple echoes exceeding the detection threshold. Specifically, the sensing node may estimate the noise power by performing channel estimation and acquiring in real time based on a received signal received by a receiver of the sensing node. This design advantage of determining the generation parameter $\beta$ of the update window sequence $w_1$ is at least that the generated update window can enable the sensing node to detect the sensing target with low main lobe power under the condition of ensuring a high resolution, thereby reducing the influence of a large reduction in the sensing resolution of the sensing node due to the use of an initial window with a large side lobe attenuation. The main application scenarios of this method may be to distinguish targets such as small cars and drones, but is not limited thereto.

In another implementation of adaptively adjusting and generating a window function, the sensing node determines the window function according to a sensing target distance range (such as a distance between the sensing node and the sensing target). According to a type of the sensing node, there are different ways to obtain the sensing target distance range. For example, when the sensing node is a terminal/base station/RSU, the sensing target distance range can be obtained according to the result of channel estimation after the initial windowing. When the sensing node is a terminal, the base station configures the sensing target distance range for the terminal. When the sensing node is an RSU, the RSU is configured with the sensing target distance range by the base station or any other RSU. Specifically, the terminal/RSU can obtain the configuration related to the sensing target distance range in at least one of downlink control information or high-layer signaling, such as radio resource control (RRC) or medium access control (MAC) signaling. The sensing node determines the window function according to the configured sensing target distance range, and detects a sensing target within the configured sensing target distance range. For example, the terminal/RSU reports to the base station a sensing result of a specific sensing target (for example, the number of sensing targets, distance, moving velocity, etc.), and the base station can, based on sensing results reported by one or more terminals/RSUs, determine or update the sensing target distance of other terminals/RSUs, and generate configuration information of the base station for the sensing target distance ranges of the terminals/RSUs. An RSU sends the sensing result of the sensing target to another RSU, and the RSU may determine or update sensing target distance ranges of the other RSUs based on the sensing result(s) sent by one or more other RSUs, and generate configuration information of the sensing target distance ranges of the RSU for the other RSUs. The specific sensing target is a sensing target within the configured sensing target distance range. Interaction between the RSUs can be implemented outside a coverage area of a cell, independent of layout of the base station, and sharing of sensing information can also be achieved, which reduces the cost of network deployment. Different distance intervals are divided according to the distance of the sensing target. Different window functions can be selected as update windows for different distance intervals. The generated update windows can have different side lobe attenuation parameters at different distances, so that the sensing node can have different sensing resolutions in different distance intervals, which improves the sensing ability of the sensing node for sensing targets with low main lobe power values in different distance intervals. When adaptively adjusting and generating a window function, adaptive adjustment of the window function in each distance range may use the method in the first or second implementation, so that the window function in each distance range can also be adaptively adjusted according to the actual result of channel estimation.

Figure 8:
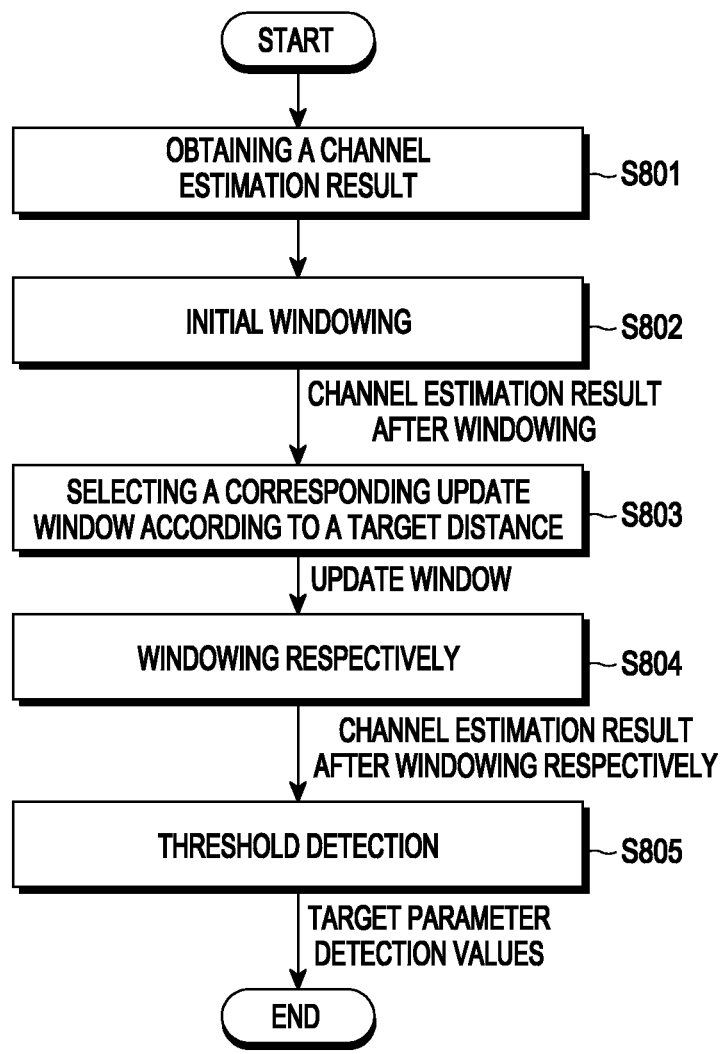
FIG. 8 illustrates a method performed by a node according to an embodiment.

FIG. 8 illustrates a method performed by a node according to an embodiment. In step S801, the sensing node obtains a result of channel estimation.

In step S802, the sensing node uses initial window to perform windowing on the result of channel estimation to obtain a result of channel estimation.

In step S803, the sensing node selects an update window function that each sensing target should use according to a distance detection value of the sensing target.

In step S804, the sensing node performs windowing with update window function on the result of channel estimation obtained in step S801, respectively.

In step S805, the sensing node performs a threshold detection on the result of channel estimation after the update windowing, to obtain target parameter detection values.

When the sensing node receives a single sensing echo signal on a single OFDM symbol or multiple sensing echo signals on multiple OFDM symbols, according to the result of channel estimation after the initial windowing, another implementation of adaptively adjusting the parameters of the window function to generate an update window may be to compare the first-dimension result of channel estimation after the initial windowing with a power threshold value $\delta_1$, and perform a maximum value search in a region exceeding the threshold value $\delta_1$. The number of maximum values searched is the number of detected sensing targets $N_1$, and the generation parameter of the update window sequence $w_1$ can be determined by the highest main lobe peak in the sensing target, that is, a greatest value and a least value among the $N_1$ maximum values as well as corresponding distances, where the power threshold value $\delta_1$ can be selected as an empirical value, and selection of the power threshold value $\delta_1$ will affect accuracy of estimation of the number of sensing targets. Specifically, assuming that the maximum values corresponding to the $N_1$ sensing targets can be expressed as $p_i$, i=1, 2, ..., $N_1$, the sampling point corresponding to the $N_1$ maximum values $p_i$ is $t_i$. According to the following Equation (5), $$r = \frac{t_1 \cdot c}{2 \cdot F_s} \; r = \frac{t_1 \cdot c}{2 \cdot F_s} \text{ (in } m\text{)}, \tag{5}$$

where $F_s$ is a sampling rate, and c is a velocity of light, the distances of the $N_1$ sensing targets can be calculated, i.e., $r_i$, i=1, 2, ..., $N_1$. For different distance intervals, different window functions can be selected, and an example relationship of window functions corresponding to different distance intervals can be that when the distance of the sensing target $r \in [R_{n-1}, R_n]$, n=1, ..., N, the sensing node chooses to use a window function $w_n$ as an update window, where $R_n = R_{max}$ (the maximum distance that can be sensed by the sensing node), $R_0 = R_{min}$ (the minimum distance that can be sensed by the sensing node), and by comparing with the window function $w_n$, a window function $w_{n+k}$ has an additional side lobe attenuation of k·Δα (in dB). This design advantage of determining the generation parameter β of the update window sequence $w_i$, i=1, 2, ..., $N_1$ is at least that the generated update window can have different resolutions at different distances, so that the sensing node can detect the sensing target with low main lobe power, thereby reducing the influence of a large reduction in the sensing resolution of the sensing node due to the use of an initial window with a large side lobe attenuation. The main application scenarios of this method may be scenarios with different requirements for resolution at different sensing distances.

The following takes a Kaiser window function as an example to give a specific example of generating an update window sequence $w_1$. Assuming that the maximum main lobe peak of the sensing target is $p_m$ (in dBm) and the noise power is $P_n$ (in dBm), the side lobe attenuation α (in dB) of the update window sequence $w_1$ can be set to $\alpha = P_m - P_n$. According to the following relationship between the side lobe attenuation α and the parameter β for generating the Kaiser window function in the following Equation (6), $$\beta = \begin{cases} 0.1102(\alpha - 8.7), & \alpha > 50 \\ 0.5842(\alpha - 21)^{0.4}, & 21 \le \alpha \le 50, \\ 0, & \alpha < 21 \end{cases} \tag{6}$$

the parameter β of the Kaiser window function can be obtained. Then, by using the function expression of the Kaiser window in the following Equation (7), $$w[n] = \frac{I_o\left(\beta\sqrt{1 - \left(\frac{n - \frac{N}{2}}{\frac{N}{2}}\right)^2}\right)}{I_0(\beta)}, n = 1, \ldots, N, \tag{7}$$

where N is a length of the result of channel estimation, $I_0$ is a first type of modified zero-order Bessel function, and β is a parameter that can control the side lobe attenuation α, the desired update window can be generated. For example, when the side lobe attenuation α of the update window sequence $w_1$ is required to be 25 dB, according to the above relationship between the attenuation α and the parameter β, $\beta = 0.5842(\alpha - 21)^{0.4} = 0.5842 \times (25-21)^{0.4} \approx 1.02$, and then the update window sequence $w_1$ with the side lobe power attenuation of 25 dB can be obtained by setting the parameter β=1.02. The update window sequence $w_1$ can be selected as any window function that has the effect of suppressing the side lobe power. As an example, the disclosure adopts a Kaiser window or a Chebyshev window having adjustable parameters but the disclosure is not limited thereto. The sensing node can determine the parameters of the update windows of the first dimension and the second dimension independently, regardless of the sequence, because the signal processing in the two dimensions is independent of each other. This advantage of independently selecting the update windows in two dimensions is to provide a more flexible update window design, and the parameters of the update windows can be adaptively adjusted according to system design and scenario requirements.

When the sensing node is a terminal, the terminal is configured with a sensing cycle by the base station. When the sensing node is an RSU, the RSU is configured with a sensing cycle by the base station or any other RSU. Specifically, the terminal/RSU can acquire relevant configuration of the sensing cycle by downlink control information or high-layer signaling such as RRC or MAC signaling. In each sensing cycle, the sensing node can choose to continue to use the window function used in a previous cycle according to an actual sensing result, or re-adjust the window function adaptively according to the parameter detection values of the sensing target, such as distance and velocity.

Figure 9:
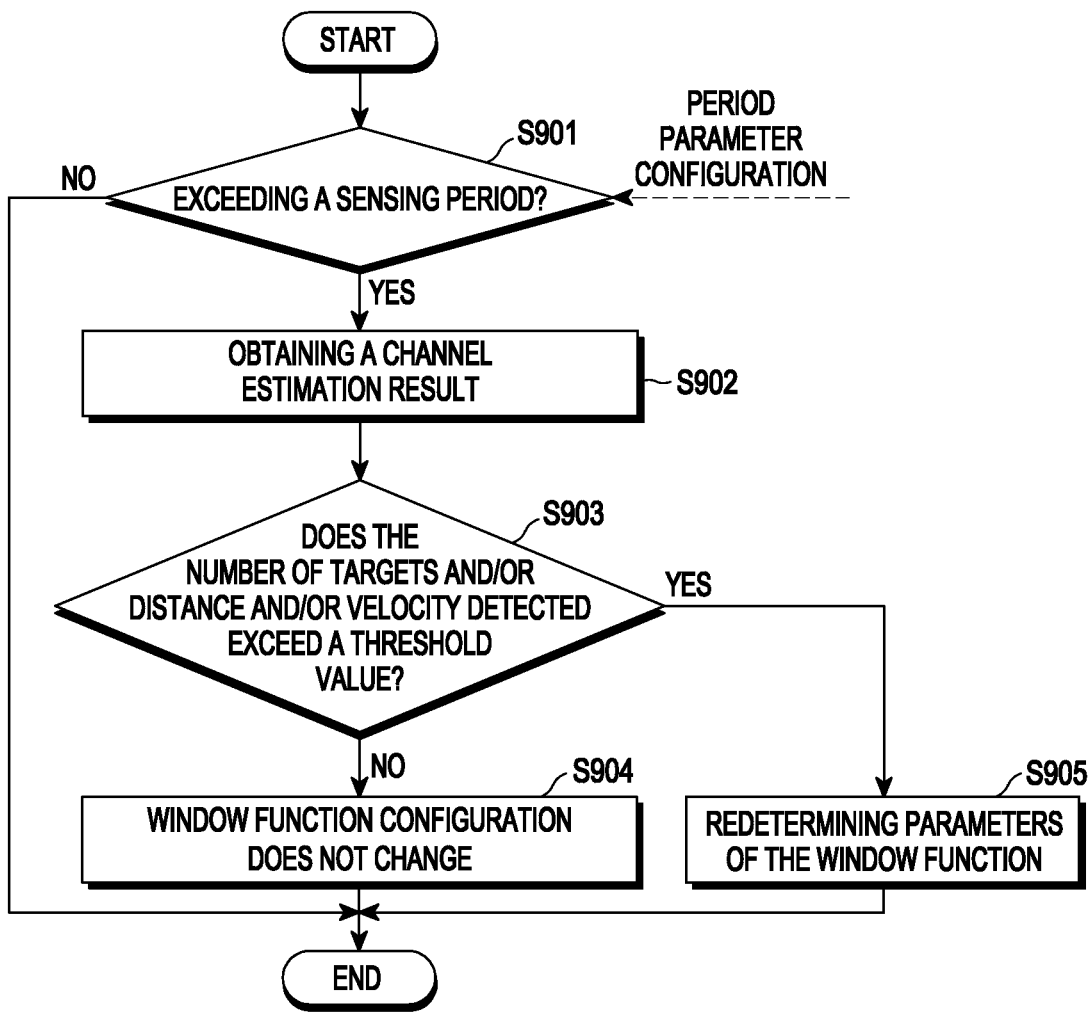
FIG. 9 illustrates a method performed by a node according to an embodiment.

FIG. 9 illustrates a method performed by a node according to an embodiment. In step S901, the sensing node configures a sensing cycle based on a cycle configuration parameter received from a second node, determines whether it is in a new sensing cycle according to the cycle configuration parameter, and if yes, proceeds to step S902. If no, the operation ends.

In step S902, the sensing node obtains a result of channel estimation. The operation of the step S902 may be the same as the operation of the step S501.

In step S903, the sensing node determines whether a change in a detection result of the sensing target detected in a current sensing cycle (for example, the number of targets and/or velocity and/or distance) compared with a detection result of the sensing target in at least one sensing cycle of the previous M sensing cycles exceeds a threshold value.

If the detection result of the sensing target is less than or equal to the threshold value, the method proceeds to step S904 in which configuration of the window function is unchanged, and use of the window function in the previous sensing cycle is continued.

If the detection result of the sensing target is greater than the threshold value, the method proceeds to step S905 in which parameters of the window function are re-determined to generate a new window function.

An implementation of window function selection by a sensing node with a sensing cycle may be to assume that the sensing node needs to sense a sensing target within a sensing range at time $t_s$, $m \cdot P_s \le t_s \le (m+1) \cdot P_s$, $m=1, \ldots, M$, $M=1, 2, 3, \ldots$, and a window function that the sensing node uses in previous m cycles $(m-1) \cdot P_s \le t_s \le m \cdot P_s$, $m=1, \ldots, M$, $M=1, 2, 3, \ldots$ is $w_p^m$, $m=1, \ldots, M$, where $P_s$ is the sensing cycle of the sensing node. The sensing node performs a windowing operation on the result of channel estimation of the current sensing cycle based on at least one window function $w_p^m$, $m=1, \ldots, M$ in the previous m cycles, and the sensing node decides whether to update the window function according to the parameter detection values of the sensing target, such as the number of sensing targets, distance, velocity, etc. Specifically, it is assumed that the distance of a sensing target i detected by the sensing node after performing the windowing on the result of channel estimation of the current sensing cycle based on at least one window function $w_p^m$, $m=1, \ldots, M$ in the previous m cycles is $r_i$, the velocity is $v_i$, $i=1, \ldots, K$, where K is the number of sensing targets in the current sensing cycle. It is assumed that the distance of a sensing target j detected by the sensing node in the previous M sensing cycles is $r_j^m$, the velocity is $v_j^m$, $j=1, \ldots, K'$, $m=1, \ldots, M$, $M=1, 2, 3, \ldots$, where in the previous M sensing cycles, the number of sensing targets is K', and M is a total number of previous sensing cycles. When a comparison result between the number of sensing targets and/or distance and/or velocity detected by the sensing node in the current sensing cycle and the number of sensing targets and/or distance and/or velocity detected in the previous M sensing cycles is greater than the threshold value, the window function needs to be updated. The update of the window function can be performed according to the methods in the first, second and/or third implementations. Otherwise, the sensing node will not perform the update operation of the window function. A method for the sensing node to compare the numbers of sensing targets detected and/or distances and/or velocities in different sensing cycles may be that difference values between the number of sensing targets, distance and velocity detected by the sensing node in the current sensing cycle, and the number of sensing targets, an average distance and an average velocity of each target detected in the previous M sensing cycles, are respectively expressed in the following Equations (8), (9) and (10), $$d_k = |K - K'| \qquad (8)$$

$$d_r^i = \left| r_i - \frac{1}{m} \sum_{m=1}^M r_i^m \right| \qquad (9)$$

$$d_v^i = \left| v_i - \frac{1}{m} \sum_{m=1}^M v_i^m \right| \qquad (10)$$

where $i=1, \ldots, K$. If $d_k=0$ and $\forall i$, $d_r^i \le \beta_d$ and/or $\forall i$, $d_v^i \le \beta_v$, the sensing node takes the distance $r_i$ and the velocity $v_i$, $i=1, \ldots, K$, as a detection result of the sensing node for the sensing target i in the current sensing cycle. The window function is not updated, wherein the threshold values $\beta_d$ (in m) and $\beta_v$ (in meters per second (m/s)) can be selected as empirical values and the selection of the threshold values $\beta_d$ and $\beta_v$ will affect the accuracy of estimation of the distance and velocity of the sensing target. Or, if $d_k > 0$ and/or $\forall i$, $d_r^i > \beta_d$ and/or $\forall i$, $d_v^i > \beta_v$, in which case the window function may be updated according to the methods in the first, second and/or third implementations. When there is a sensing cycle, one advantage of selecting the above window function is that, when the sensing target does not have a large change in the distance and velocity, the sensing node can continue to use the window function of the previous cycle for sensing, thereby reducing complexity of adaptively adjusting the window function. When the sensing node is a terminal/RSU and the second node is a base station, or when the sensing node is an RSU and the second node is another RSU, the sensing node can determine whether the sensing cycle is exceeded through a time slot index synchronized with the second node.

When the sensing node only receives a single sensing echo signal on a single OFDM symbol, an implementation of using an update window for windowing may be that the sensing node generates an update window $W_1[k]$, $k=1, 2, \ldots, N_{FFT}$ of a length $N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. The first-dimension frequency-domain result of channel estimation of the single echo $H[k]$, $k=1, 2, \ldots, N_{FFT}$ is multiplied with the update window sequence $W_1[k]$, $k=1, 2, \ldots, N_{FFT}$ to obtain the result of channel estimation after windowing of the first-dimension frequency domain, i.e., $H_{w1}[k]=H[k]\cdot W_1[k]$, $k=1, 2, \ldots, N_{FFT}$.

Another implementation of using an update window to perform windowing may be to generate an update window sequence $W_1[k]$, $k=1, 2, \ldots, N_{FFT}$ of a length $N_{FFT}$, and perform inverse Fourier transform of $N_{FFT}$ points on the window function sequence to obtain a time-domain expression of the update window $w_1[n]$, $n=1, 2, \ldots, N_{FFT}$ of the length $N_{FFT}$. The first-dimension time-domain result of channel estimation of the single echo $h[n]$, $n=1, 2, \ldots, N_{FFT}$ is convolved with the time-domain expression $w_1[n]$ of the update window to obtain the result of channel estimation after windowing of the first-dimension time domain of the single echo, i.e., $h_{w1}[n]=h[n]\circledast w_1[n]$, $n=1, 2, \ldots, N_{FFT}$, where $\circledast$ represents a convolution operation.

When the sensing node receives multiple sensing echo signals on multiple OFDM symbols, using the update window to perform windowing involves two-dimensional processing of the first dimension and the second dimension, in the first dimension, the sensing node generates a first update window sequence $W_1^1[k]$, $k=1, 2, \ldots, N_{FFT}$ of the length $N_{FFT}$, and then multiplies the frequency-domain result of channel estimation $H[l', k]$, $k=1, 2, \ldots, N_{FFT}$ of an $l'$-th echo signal with the first update window sequence $W_1^1[k]$, $k=1, 2, \ldots, N_{FFT}$ to obtain the result of channel estimation of the $l'$-th echo signal after windowing of the first-dimension frequency domain, i.e., $H_{w1}^1[l', k]=H[l', k] \cdot W_1^1[k]$, $k=1, 2, \ldots, N_{FFT}$, wherein, $N_{FFT}$ is the number of sampling points of a single echo, and is also the length of the first-dimension time-domain/frequency-domain result of channel estimation, and the number of points of the Fourier transform/inverse Fourier transform between the first-dimension time domain and frequency domain. The result of channel estimation after windowing of the frequency domain, i.e., $H_{w1}^1[l, k]$ is subjected to the inverse Fourier transform of the first dimension to obtain the time-domain result of channel estimation $h_{w1}^1[l, n]$. Another implementation of using the update window to perform windowing in the first dimension may be to generate a first update window sequence $W_1^1[k]$, $k=1, 2, \ldots, N_{FFT}$ of the length $N_{FFT}$, and perform inverse Fourier transform of $N_{FFT}$ points on the window function sequence to obtain a time-domain expression of the first update window sequence $w_1^1[n]$, $n=1, 2, \ldots, N_{FFT}$ of the length $N_{FFT}$, and then, convolve the first-dimension time-domain result of channel estimation of the $l'$-th echo signal, i.e., $h[l', n]$, $n=1, 2, \ldots, N_{FFT}$, with the time-domain expression of the first update window sequence $w_1^1[n]$, $n=1, 2, \ldots, N_{FFT}$ to obtain the time-domain result of channel estimation after windowing of the first dimension of the $l'$-th echo signal, i.e., $h_{w1}^1[l', n]=h[l', n]\circledast w_1^1[n]$, $n=1, 2, \ldots, N_{FFT}$. The result of channel estimation after windowing of the first dimension of the $N_s$ echoes is obtained after the $N_s$ echo signals are subjected to the first dimension processing. Another implementation of using the update window to perform windowing in the second dimension may be to generate a second update window sequence $w_2^1[n]$, $n=1, 2, \ldots, N_s$ of a length $N_s$, where $N_s$ is the number of sensing signals transmitted by the sensing node, and is also the number of points for Fourier transform/inverse Fourier transform between the second-dimension time domain and the Doppler domain. Then, the second-dimension time-domain result of channel estimation $h[l, n']$, $l=1, 2, \ldots, N_s$ of the echo signal at an $n'$-th sampling point is multiplied with the second update window sequence $w_1^2[n]$, $n=1, 2, \ldots, N_s$, to obtain the result of channel estimation after windowing of the second-dimension time domain of the echo signal at the $n'$-th sampling point, i.e., $h_{w1}^2[l', n]=h[l', n]\cdot w_1^2[n]$, $n=1, 2, \ldots, N_s$. Fourier transform of $N_s$ points is then performed on the result of channel estimation $h_{w1}^2[l', n]$ after windowing of the second-dimension time domain of the echo signal, and the Doppler-domain result of channel estimation $H_{D\_wo}[m, n]$ after windowing can be obtained, where $m=1, 2, \ldots, N_s$, $n=1, 2, \ldots, N_{FFT}$. Another implementation of using the update window to perform windowing in the second dimension may be to generate a second update window sequence $w_1^2[n]$, $n=1, 2, \ldots, N_s$ of the length $N_s$, and perform Fourier transform of $N_s$ points on the window function sequence to obtain the Doppler domain expression of the second update window sequence of the length $N_s$, i.e., $W_1^2[k]$, $k=1, 2, \ldots, N_s$. The second-dimension Doppler result of channel estimation of the echo signal at the $n'$-th sampling point, $H_D[m, n']$, $m=1, 2, \ldots, N_s$, is convolved with the Doppler domain expression of the second update window sequence, $W_1^2[m]$, $m=1, 2, \ldots, N_s$, to obtain the result of channel estimation after windowing of the second-dimension Doppler domain of the echo signal at the $n'$-th sampling point, i.e., $H_{D\_w1}[m, n']=H_D[m, n']\circledast W_1^2[m]$, $m=1, 2, \ldots, N_s$. The result of channel estimation after windowing in the second dimension of the $N_{FFT}$ echoes is obtained after the echo signals at $N_{FFT}$ sampling points are subjected to the above second-dimension processing. In the process of obtaining the windowed first-dimension and/or second-dimension result of channel estimations of the sensing node, the sequence of the first-dimension windowing and the second-dimension windowing of the sensing echo signal can be exchanged, and the window function of a corresponding dimension can be selected independently, since the signal processing in the two dimensions is independent of each other. Independently selecting window functions in the two dimensions increases the flexibility of the window functions, and the same or different window functions can be selected for windowing according to system design and scene requirements. The windowing process may also be expressed using the update window in the first dimension and the second dimension at the same time as follows. The frequency-domain result of channel estimation of the $N_s$ echo signals is expressed as a matrix $$H = \begin{bmatrix} H_{11} & \cdots & H_{1N_{FFT}} \\ \vdots & \ddots & \vdots \\ H_{N_s 1} & \cdots & H_{N_s N_{FFT}} \end{bmatrix},$$

where a matrix size is $N_s \times N_{FFT}$. Each row of matrix $H$ represents the result of channel estimation of a single sensing echo signal on a single OFDM symbol, and each column represents the result of channel estimation of the echo signal corresponding to a single sampling point. The first update window sequence of the length $N_{FFT}$ generated by the sensing node is expressed as a column vector $w^1 = [w_1^1, w_2^1, \ldots, w_{N_{FFT}}^1]^T$, and the second update window sequence of the length $N_s$ is expressed as a vector $w^2 = [w_1^2, w_2^2, \ldots, w_{N_s}^2]^T$. The result of channel estimation after windowing can be expressed as a matrix $H_w = FH \odot W_0^1 F^* \odot W_0^2$, where $\odot$ is Hadamard product operation, Fourier transform operation matrix $F =$ $$\begin{bmatrix} 1 & 1 & 1 & \cdots & 1 \\ 1 & \omega^{-1} & \omega^{-2} & \cdots & \omega^{-(N_{FFT}-1)} \\ 1 & \omega^{-2} & \omega^{-4} & \cdots & \omega^{-2(N_{FFT}-1)} \\ \vdots & \vdots & \vdots & \ddots & \vdots \\ 1 & \omega^{-(N_{FFT}-1)} & \omega^{-2(N_{FFT}-1)} & \cdots & \omega^{-(N_{FFT}-1)(N_{FFT}-1)} \end{bmatrix},$$

inverse Fourier transform operation matrix $F^* =$ $$\frac{1}{N_{FFT}} \begin{bmatrix} 1 & 1 & 1 & \cdots & 1 \\ 1 & \omega & \omega^2 & \cdots & \omega^{(N_{FFT}-1)} \\ 1 & \omega^2 & \omega^4 & \cdots & \omega^{2(N_{FFT}-1)} \\ \vdots & \vdots & \vdots & \ddots & \vdots \\ 1 & \omega^{(N_{FFT}-1)} & \omega^{2(N_{FFT}-1)} & \cdots & \omega^{(N_{FFT}-1)(N_{FFT}-1)} \end{bmatrix}, \text{ where } \omega = e^{\frac{2\pi i}{N_{FFT}}},$$

the first-dimension window function matrix is $W_0^1 = [w^1, w^1, \ldots, w^1]^T$, the matrix size is $N_s \times N_{FFT}$, and the second-dimension window function matrix is $w_0^2 = [w^2, w^2, \ldots, w^2]$, and the matrix size is $N_s \times N_{FFT}$.

Returning to the method of FIG. 5, in step S504, the sensing node obtains a combination of one or more of the number of sensing targets, the distance of the sensing target, and the velocity of the sensing target through a threshold detection.

When the sensing node only receives a single sensing echo signal on a single OFDM symbol, a threshold detection by the sensing node based on the first-dimension time-domain result of channel estimation after update windowing of the single echo may be that the time-domain result of channel estimation after update windowing is compared with a power threshold. The number of maximum values greater than the power threshold is the number of detected sensing objects, and a distance between the sensing object and the sensing node can be calculated according to the sampling point corresponding to the maximum value. Specifically, the power threshold may be a fixed value or a real-time calculated value related to statistical characteristics of noise. For example, the sensing node obtains statistical characteristics such as a variance of the noise for power threshold calculation, and the sensing node obtains the noise by obtaining the channel estimation in real time based on the echo signal, or by setting a fixed noise variance according to an empirical value or a theoretical value. This design has a simple operation and low computational complexity. For example, assume that a fixed power threshold is $\delta$, the number of sensing signals transmitted by sensing node $N_s = 1$, and the time-domain result of channel estimation after update windowing is $h_{w1}[n]$, $n=1, 2, \ldots, N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. If $\forall n$, $h_{w1}[n] \leq \delta$, it is determined that there is no target in the sensing region. Otherwise, among all $n_i$, $i=1, 2, \ldots, K_1$ satisfying $h_{w1}[n_i] > \delta$, $i=1, 2, \ldots, K_1$, a maximum value $h_{w1}[n_j] \in h_{w1}[n_j]$, $i=1, 2, \ldots, K_1$ is searched, where a resolution unit corresponding to a j-th maximum value is $n_j$, $j=1, 2, \ldots, K_2$, then the number of sensing targets is $K_2$. A resolution unit set corresponding to the maximum values searched in a single echo is denoted as $\xi = U_{i=1}^{K_2} n_j$, and elements in the set $\xi$ are the sampling points corresponding to all the sensing objects sensed from the received single echo. According to a one-to-one corresponding relationship between the distance r between the sensing target and the sensing node and the sampling point n, the distance of all sensing targets can be calculated in Equation (11) as follows, $$r_i = \frac{n_i \cdot c}{2 \cdot F_s} \text{ (in m)}, i = 1, 2, \ldots, K_2, \tag{11}$$

where c is the velocity of light (in m/s), and $F_s$ is the sampling rate (in Hz).

When the sensing node receives multiple sensing echo signals on multiple OFDM symbols, the sensing node performs a first-level over-threshold detection and a second-level over-threshold detection successively according to the first-dimension and second-dimension result of channel estimations after update windowing of the multiple echoes. An implementation of the two-level threshold detection may be that the first-dimension time-domain result of channel estimation after update windowing is compared with a first-level power threshold. Then, the number of maximum values greater than the power threshold is the number of detected sensing objects, and a distance between the sensing object and the sensing node can be calculated according to the sampling point corresponding to the maximum value. The second-dimension Doppler domain result of channel estimation after update windowing is compared with a second-level power threshold, then the number of maximum values greater than the power threshold is the number of detected sensing targets, and according to the sampling point corresponding to the maximum value, the velocity of the sensing target relative to the sensing node can be obtained. Specifically, the power threshold may be a fixed value or a real-time calculated value related to statistical characteristics of noise. For example, the sensing node obtains statistical characteristics such as a variance of the noise for power threshold calculation, and the sensing node obtains the noise by obtaining the channel estimation in real time based on the echo signal, or by setting a fixed noise variance according to an empirical value or a theoretical value. This design has a simple operation and low computational complexity. For example, assume that a fixed power threshold is $\delta_1$, the number of sensing signals transmitted by sensing node is $N_s$, and the time-domain result of channel estimation after update windowing is $h_{w1}[l, n]$, $n=1, 2, \ldots, N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. If $\forall n$, $h_{w1}[l, n] \leq \delta_1$, it is determined that there is no target in the sensing region. Otherwise, among all $n_i$, $i=1, 2, \ldots, K_1$ satisfying $h_{w1}^1[l, n_i] > \delta_1$, $i=1, 2, \ldots, K_1$, a maximum value $h_{w1}[n_j] \in h_{w1}^1[l, n_j]$, $i=1, 2, \ldots, K_1$ is searched, wherein a resolution unit corresponding to a j-th maximum value is $n_j$, $j=1, 2, \ldots, K_2$, then the number of sensing targets is $K_2$. A resolution unit set corresponding to the maximum values searched in a single echo is denoted as $\xi = U_{i=1}^{K_2} n_j$, and elements in the set $\xi$ are the sampling points corresponding to all the sensing targets sensed from the received single echo. According to a one-to-one corresponding relationship between the distance r between the sensing target and the sensing node and the sampling point n, the distance of all sensing targets can be calculated in Equation (12) as follows, $$r_i = \frac{n_i \cdot c}{2 \cdot F_s} \text{(in m)}, i = 1, 2, \ldots, K_2, \qquad (12)$$

where c is the velocity of light (in m/s), and $F_s$ is the sampling rate in hertz (Hz). Then, the second-level power threshold detection is performed on the Doppler domain result of channel estimation after update windowing $H_{D\_w1}[m, n_j]$, where $n_j$, $j=1, 2, \ldots, K_2$ is a distance resolution unit of the first-dimension sensing target, and $K_2$ is the number of sensing targets. Assuming a fixed power threshold $\delta_2$, among all $m_i$, $i=1, 2, \ldots, K_1$, $j=1, 2, \ldots, K_2$ satisfying $H_{D\_w1}[m_i, n_j] > \delta_2$, $i=1, 2, \ldots, K_1$, a maximum value $H_{D\_w1}[m_g, n_j] \in H_{D\_w1}[m_i, n_j]$ is searched, where a Doppler frequency corresponding to the g-th maximum value is $m_g$, $g=1, 2, \ldots, K_3$, then the number of sensing targets at the distance resolution unit $n_j$ is $K_3$. According to a one-to-one corresponding relationship between the velocity v between the sensing target and the sensing node and the Doppler frequency m, the velocity of all sensing targets can be calculated in Equation (13) as follows, $$v_i = \frac{-(m_g - N_s - 1) \cdot PRF \cdot \lambda}{2 \cdot N_s \cdot PRT} \text{(in m/s)}, j = 1, 2, \ldots, K_g, \qquad (13)$$

where PRT is a repeating cycle of the sensing signal, and $\lambda$ is a wavelength of the sensing signal (in m).

The initial windowing may be omitted when the noise power is determined based on an empirical value or a theoretical value. An echo target detection method with an adaptive window function that does not include an initial window (hereinafter Method 2) is that a channel estimation and/or Doppler estimation result is obtained by receiving and processing an echo signal of a sensing signal transmitted by a sensing node. Then, a window function processing (hereinafter windowing) is adaptively applied to the result to determine sensing information. For example, the sensing information includes whether there is a sensing target, the number of sensing targets, a distance between each sensing target and the sensing node, and a moving velocity of each sensing target.

Figure 10:
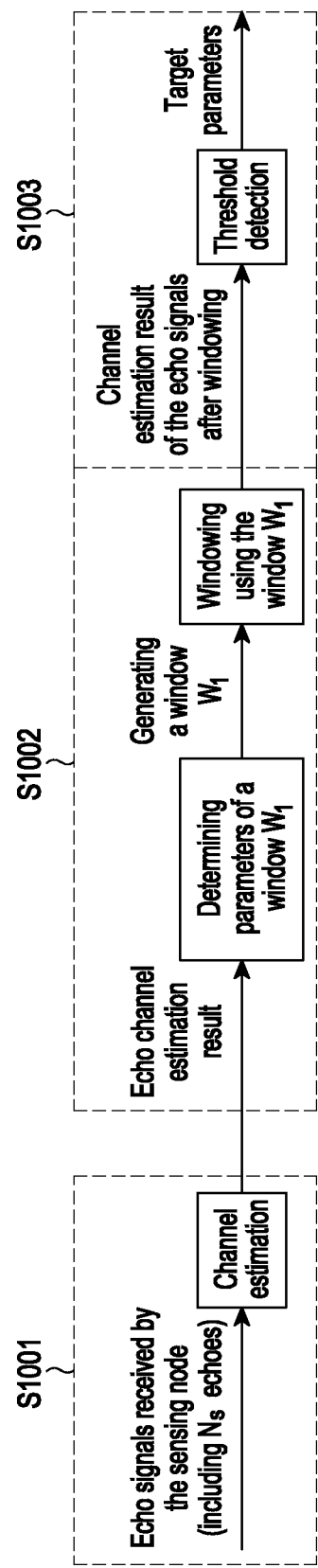
FIG. 10 illustrates a method performed by a node according to an embodiment.

FIG. 10 illustrates a method performed by a node according to an embodiment. In step S1001, the sensing node transmits a sensing signal and receives an echo signal for the sensing signal, and performs channel estimation based on the echo signal to obtain an estimation result. The sensing node may transmit a single sensing signal or multiple sensing signals, and the single sensing signal or multiple sensing signals may be transmitted to a specific sensing region. A mode of transmitting to a specific sensing region may be a single sensing signal or multiple sensing signals transmitted by using a same transmit beam. Transmitting the single sensing signal or multiple sensing signals may include transmitting sensing signals of a same sequence once or repeatedly, or transmitting sensing signals of a same length but different sequences once or multiple times.

When the sensing node transmits a single sensing signal, the sensing node receives an echo time-domain signal of the single sensing signal and performs channel estimation on the signal to obtain a result of channel estimation thereof. Channel estimation may be frequency-domain channel estimation or time-domain channel estimation. In an existing system such as LTE or NR, the frequency-domain channel estimation is the most widely used. An implementation of channel estimation is described below based on the frequency-domain channel estimation of the least square criterion.

A time-domain signal of a single echo on a single OFDM symbol received by the sensing node can be denoted as $y[n]$, $n=1, 2, \ldots, N_{FFT}$, and then, the signal $y[n]$ is subjected to Fourier transform of the number of points $N_{FFT}$, to obtain a frequency-domain signal of the single echo, denoted as $Y[k]$, $k=1, 2, \ldots, N_{FFT}$. A frequency-domain result of channel estimation based on the least square criterion is $H[k]=Y[k]/S[k]$, $k=1, 2, \ldots, N_{FFT}$, where $S[k]$, $k=1, 2, \ldots, N_{FFT}$ is a frequency-domain sequence of the sensing signal. Inverse Fourier transform is performed on the frequency-domain result of channel estimation $H[k]$, and a time-domain result of channel estimation of the single echo, i.e., $h[n]$, $n=1, 2, \ldots, N_{FFT}$ can be obtained. The channel estimation method is not limited to least square estimation, and other channel estimation methods such as minimum mean square estimation, linear minimum mean square estimation, and maximum likelihood estimation, may be used.

When the sensing node transmits multiple sensing signals, the sensing node stores the received echo signals in a two-dimensional matrix (hereinafter a two-dimensional echo signal), where a time dimension of a single echo signal serves as one dimension of the two-dimensional matrix (short-time processing dimension, that is, the time dimension within a single sensing signal, hereinafter a first dimension), the number of times that echo signals are received is the other dimension of the two-dimensional matrix (long-time processing dimension, that is, the dimension of the number of sensing signals, hereinafter a second dimension). In the first dimension, an echo signal processing method is the same as the echo signal processing method when the sensing node transmits a single sensing signal. In the second dimension, a Doppler domain result of channel estimation can be obtained by performing Fourier transform of $N_s$ points on the time-domain result of channel estimation of multiple echoes, where $N_s$ is the number of sensing signals transmitted by the sensing node. Similarly, the channel estimation based on the two-dimensional echo signal can also be performed in frequency domain or time domain, that is, the frequency-domain channel estimation or the time-domain channel estimation. When the sensing node transmits $N_s$ sensing signals to a certain sensing region, where $N_s>1$, and performs a first-dimension frequency-domain channel estimation and a second-dimension Doppler channel estimation on the received $N_s$ echo signals as an example, a first-dimension frequency-domain expression of a single sensing signal transmitted by the sensing node can be denoted as $S[k]$, $k=1, 2, \ldots, N_{FFT}$, where $N_{FFT}$ is the number of sampling points of the single sensing signal transmitted by the sensing node, and is also a length of a first-dimension time-domain/frequency-domain result of channel estimation, and the number of points of Fourier transform/inverse Fourier transform between the first-dimension time domain and frequency domain. A time-domain signal of an l'-th echo received by the sensing node can be denoted as $y[l', n]$, $n=1, 2, \ldots, N_{FFT}$, where $l'=1, 2, \ldots, N_s$. The time-domain signal of the l'-th echo is subjected to Fourier transform of the number of points $N_{FFT}$, a first-dimension frequency-domain signal of the l'-th echo can be obtained, denoted as $Y[l', k]$, $k=1, 2, \ldots, N_{FFT}$, and the frequency-domain result of channel estimation of the l'-th echo is $H[l', k]=Y[l', k]/S[k]$, $k=1, 2, \ldots, N_{FFT}$. Inverse Fourier transform is performed on the frequency-domain result of channel estimation $H[l', k]$ to obtain the first-dimension time-domain result of channel estimation of the l'-th echo, h[l', n], n=1, 2, ..., $N_{FFT}$. A second-dimension time-domain expression of an echo signal at an n'-th sampling point can be denoted as h[l, n'], l=1, 2, ..., $N_s$, and the Fourier transform of $N_s$ points of the second dimension is performed on h[l, n'], l=1, 2, ..., $N_s$ to obtain the time domain and Doppler domain result of channel estimations, denoted as $H_{TD}$[m, n], where m=1, 2, ..., $N_s$, n=1, 2, ..., $N_{FFT}$. In the process of receiving multiple sensing echo signals and performing first-dimension and second-dimension channel estimation on the signals by the sensing node, an order of the first dimension processing and the second dimension processing of the sensing echo signals can be exchanged since the signal processing in the two dimensions is independent of each other.

In step S1002, the sensing node adaptively adjusts and generates a window function according to the result of channel estimation and performs windowing on the result of channel estimation of the first dimension and/or the second dimension.

In adaptively adjusting and generating a window function, according to the result of channel estimation, the sensing target A corresponding to the maximum main lobe power $p_1$ is determined, a difference between the noise power $p_0$ and the maximum main lobe power $p_1$ of the sensing target A is determined by an empirical value or a theoretical value as a parameter for generating the window function. The generated window function can suppress the side lobe power of the sensing target A corresponding to the maximum power value $p_1$ to be less than the noise power $p_0$, thereby reducing the influence of the side lobe power of a sensing target with a high main lobe power on the sensing target with a low main lobe power. This improves the sensing ability of the sensing node for the sensing target with the low main lobe power.

When the sensing node receives a single sensing echo signal on a single OFDM symbol or multiple sensing echo signals on multiple OFDM symbols, according to the result of channel estimation, adaptively adjusting and generating the window function may include comparing the first-dimension result of channel estimation with a power threshold value $\delta_1$, and performing a maximum value search in a region exceeding the threshold value $\delta_1$. The number of maximum values searched is the number of detected sensing targets $N_1$, and the generation parameter of the window function sequence $w_1$ can be determined by the highest main lobe peak in the sensing target, that is, a greatest value among the $N_1$ maximum values, where the power threshold value $\delta_1$ can be selected as an empirical value, and selection of the power threshold value $\delta_1$ will affect accuracy of estimation of the number of sensing targets. Specifically, assuming that the maximum values corresponding to the $N_1$ sensing targets can be expressed as $p_i$, i=1, 2, ..., $N_1$, and the $N_1$ maximum values can constitute a sensing target set $P_{col} = U_{i=1}^{N_1} p_i$, the greatest value of the $N_1$ maximum values is defined as the highest main lobe peak $p_1$, where $p_1$=max ($P_{col}$). The side lobe attenuation $\alpha$ (in dB) of the window function sequence $w_1$ should satisfy $\alpha \geq p_1 - p_0 + v$, where, $p_0$ is the noise power set according to an empirical value or a theoretical value, v (in dB) is a variable that can be set, and its typical value is 0. An advantage of defining the variable v that can be set is at least to prevent detection of false targets due to the coherent superposition of multiple echoes exceeding the detection threshold. The above-mentioned advantage of determining the generation parameter β of the window function sequence $w_1$ is at least to reduce complexity and suppress, by the generated window function, the side lobe power of the sensing target with higher main lobe power to be less than the noise power, so that the sensing node can detect sensing targets with lower main lobe power. Application scenarios of this method may be to distinguish targets such as large cars and airplanes, but the disclosure is not limited thereto.

The following takes a Kaiser window function as an example to give a specific example of generating a window function sequence $w_1$. Assuming that the maximum main lobe peak of the sensing target is $p_m$ (in dBm) and the noise power is $P_n$ (in dBm), the side lobe attenuation $\alpha$ (in dB) of the window function sequence $w_1$ can be set to $\alpha = P_m - P_n$. According to the following relationship between the side lobe attenuation $\alpha$ and the parameter β in the following Equation (14) for generating the Kaiser window function:

$$\beta = \begin{cases} 0.1102(\alpha - 8.7), & \alpha > 50 \\ 0.5842(\alpha - 21)^{0.4}, & 21 \leq \alpha \leq 50, \\ 0, & \alpha < 21 \end{cases} \quad (14)$$

the parameter β of the Kaiser window function can be obtained. Then, by using the function expression of the Kaiser window in Equation (15) as follows, $$w[n] = \frac{I_0\left(\beta \sqrt{1 - \left(\frac{n - \frac{N}{2}}{\frac{N}{2}}\right)^2}\right)}{I_0(\beta)}, , n = 1, ..., N, \quad (15)$$

where N is a length of the result of channel estimation, $I_0$ is a first type of modified zero-order Bessel function, and β is a parameter that can control the side lobe attenuation $\alpha$, the desired window function can be generated. For example, when the side lobe attenuation $\alpha$ of the window function sequence $w_1$ is required to be 25 dB, according to the above relationship between the attenuation $\alpha$ and the parameter β, it can be obtained $\beta = 0.5842(\alpha - 21)^{0.4} = 0.5842 \times (25 - 21)^{0.4} \cong 1.02$, and then the window function sequence $w_1$ with the side lobe power attenuation of 25 dB can be obtained by setting the parameter $\beta = 1.02$. Note that the window function sequence $w_1$ can be selected as any window function that has the effect of suppressing the side lobe power. For example, the disclosure adopts a Kaiser or Chebyshev window having adjustable parameters, but the disclosure is not limited thereto. The sensing node can determine the parameters of the window functions of the first dimension and the second dimension independently, regardless of the sequence, because the signal processing in the two dimensions is independent of each other. Independently selecting the window functions in two dimensions enhances flexibility of the window functions, and the parameters of the window functions can be adaptively adjusted according to system design and scenario requirements.

When the sensing node is a terminal, the terminal is configured with a sensing cycle by the base station. When the sensing node is an RSU, the RSU is configured with a sensing cycle by the base station or another RSU. Specifically, the terminal/RSU can acquire relevant configuration of the sensing cycle by downlink control information or high-layer signaling such as RRC or MAC signaling. In each sensing cycle, the sensing node can choose to continue to use the window function used in a previous cycle according to an actual sensing result, or re-adjust the window function adaptively according to the parameter detection values of the sensing target, such as distance and velocity.

A window function selection by a sensing node with a sensing cycle may be to assume that the sensing node needs to sense a sensing target within a sensing range at time $t_s$, $m \cdot P_s \leq t_s \leq (m+1) \cdot P_s$, $m=1, \ldots, M$, $M=1, 2, 3, \ldots$, and a window function that the sensing node uses in previous m cycles $(m-1) \cdot P_s \leq t_s \leq m \cdot P_s$, $m=1, \ldots, M$, $M=1, 2, 3, \ldots$ is $w_p^m$, $m=1, \ldots, M$, where $P_s$ is the sensing cycle of the sensing node. The sensing node performs windowing operation on the result of channel estimation of the current sensing cycle based on at least one window function $w_p^m$, $m=1, \ldots, M$ in the previous m cycles, and the sensing node decides whether to update the window function according to the parameter detection values of the sensing target, such as the number of sensing targets, distance, and velocity. Specifically, it is assumed that the distance of a sensing target i detected by the sensing node after performing windowing on the result of channel estimation of the current sensing cycle based on at least one window function $w_p^m$, $m=1, \ldots, M$ in the previous m cycles is $r_i$, and the velocity is $v_i$, $i=1, \ldots, K$, where K is the number of sensing targets in the current sensing cycle. The distance of a sensing target j detected by the sensing node in the previous M sensing cycles is $r_j^m$, the velocity is $v_j^m$, $j=1, \ldots, K'$, $m=1, \ldots, M$, $M=1, 2, 3, \ldots$, where, in the previous M sensing cycles, the number of sensing targets is K', and M is a total number of previous sensing cycles. When a comparison result between the number of sensing targets and/or distance and/or velocity detected by the sensing node in the current sensing cycle and the number of sensing targets and/or distance and/or velocity detected in the previous M sensing cycles is greater than the threshold value, the window function needs to be updated. The update of the window function can be performed according to the methods in the first, second and/or third implementations. Otherwise, the sensing node will not perform the update operation of the window function. A method for the sensing node to compare the numbers of sensing targets detected and/or distances and/or velocities in different sensing cycles may be that difference values between the number of sensing targets, distance and velocity detected by the sensing node in the current sensing cycle, and the number of sensing targets, an average distance and an average velocity of each target detected in the previous M sensing cycles, are respectively expressed in Equations (16), (17) and (18) as follows, $$d_k = |K - K'| \tag{16}$$

$$d_r^i = \left| r_i - \frac{1}{m} \sum_{m=1}^{M} r_i^m \right| \tag{17}$$

$$d_v^i = \left| v_i - \frac{1}{m} \sum_{m=1}^{M} v_i^m \right| \tag{18}$$

where $i=1, \ldots, K$. If $d_k=0$ and $\forall i$, $d_r^i \leq \beta_d$ and/or $\forall i$, $d_v^i \leq \beta_v$, then the sensing node takes the distance $r_i$ and the velocity $v_i$, $i=1, \ldots, K$, as a detection result of the sensing node for the sensing target i in the current sensing cycle. The window function is not updated, wherein the threshold values $\beta_d$ (in m) and $\beta_v$ (in m/s) can be selected as empirical values, and the selection of the threshold values $\beta_d$ and $\beta_v$ will affect the accuracy of estimation of the distance and velocity of the sensing target. Alternatively, if $d_k > 0$ and/or $\forall i$, $d_r^i > \beta_d$ and/or $\forall i$, $d_v^i > \beta_v$, the window function may be updated according to the methods in the first, second and/or third implementations. When there is a sensing cycle, one advantage of selecting the above window function is that, when the distance and velocity of the sensing target are largely unchanged, the sensing node can continue to use the window function of the previous cycle for sensing, thereby reducing complexity of adaptively adjusting the window function. When the sensing node is a terminal/RSU and the second node is a base station. When the sensing node is a RSU and the second node is another RSU, the sensing node can determine whether the sensing cycle is exceeded through a time slot index synchronized with the second node.

When the sensing node only receives a single sensing echo signal on a single OFDM symbol, the sensing node generates a window function $W_1[k]$, $k=1, 2, \ldots, N_{FFT}$ of a length $N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. The first-dimension frequency-domain result of channel estimation of the single echo $H[k]$, $k=1, 2, \ldots, N_{FFT}$ is multiplied with the window function sequence $W_1[k]$, $k=1, 2, \ldots, N_{FFT}$ to obtain the result of channel estimation after windowing of the first-dimension frequency domain, i.e., $H_{w1}[k] = H[k] \cdot W_1[k]$, $k=1, 2, \ldots, N_{FFT}$. Alternatively, a window function sequence $W_1[k]$, $k=1, 2, \ldots, N_{FFT}$ of a length $N_{FFT}$, is generated, and inverse Fourier transform of $N_{FFT}$ points is performed on the window function sequence to obtain a time-domain expression of the window function $w_1[n]$, $n=1, 2, \ldots, N_{FFT}$ of the length $N_{FFT}$. The first-dimension time-domain result of channel estimation of the single echo $h[n]$, $n=1, 2, \ldots, N_{FFT}$ is convolved with the time-domain expression $w_1[n]$ of the window function to obtain the result of channel estimation after windowing of the first-dimension time domain of the single echo, i.e., $h_{w1}[n] = h[n] \circledast w_1[n]$, $n=1, 2, \ldots, N_{FFT}$, where $\circledast$ represents a convolution operation.

When the sensing node receives multiple sensing echo signals on multiple OFDM symbols, using the window function to perform windowing involves two-dimensional processing of the first dimension and the second dimension. Windowing using the window function in the first dimension may be that, in the first dimension, the sensing node generates a first window function sequence $W_1^1[k]$, $k=1, 2, \ldots, N_{FFT}$ of the length $N_{FFT}$, and then multiplies the frequency-domain result of channel estimation $H[l', k]$, $k=1, 2, \ldots, N_{FFT}$ of an l'-th echo signal with the first window function sequence $W_1^1[k]$, $k=1, 2, \ldots, N_{FFT}$ to obtain the result of channel estimation of the l'-th echo signal after windowing of the first-dimension frequency domain, i.e., $H_{w1}^1[l', k] = H[l', k] \cdot W_1^1[k]$, $k=1, 2, \ldots, N_{FFT}$, wherein, $N_{FFT}$ is the number of sampling points of a single echo, and is also the length of the first-dimension time-domain/frequency-domain result of channel estimation, and the number of points of the Fourier transform/inverse Fourier transform between the first-dimension time domain and frequency domain. The result of channel estimation after windowing of the frequency domain, i.e., $H_{w1}^1[l, k]$ is subjected to the inverse Fourier transform of the first dimension to obtain the time-domain result of channel estimation $h_{w1}^1[l, n]$. Windowing in the first dimension may also be performed by generating a first window function sequence $W_1^1[k]$, $k=1, 2, \ldots, N_{FFT}$ of the length $N_{FFT}$, performing inverse Fourier transform of $N_{FFT}$ points on the window function sequence to obtain a time-domain expression of the first window function sequence $w_1^1[n]$, $n=1, 2, \ldots, N_{FFT}$ of the length $N_{FFT}$, and convolving the first-dimension time-domain result of channel estimation of the l'-th echo signal, i.e., $h[l',$ n], n=1, 2, ..., $N_{FFT}$, with the time-domain expression of the first window function sequence $w_1^1[n]$, n=1, 2, ..., $N_{FFT}$ to obtain the time-domain result of channel estimation after windowing of the first dimension of the l'-th echo signal, i.e., $h_{w1}^1[l', n]=h[l', n] \circledast w_1^1[n]$, n=1, 2, ..., $N_{FFT}$. The result of channel estimation after windowing of the first dimension of the $N_s$ echoes is obtained after the $N_s$ echo signals are subjected to the first-dimension processing. Windowing may also be performed in the second dimension by generating a second window function sequence $w_1^2[n]$, n=1, 2, ..., $N_s$, of a length $N_s$, where $N_s$ is the number of sensing signals transmitted by the sensing node, and is also the number of points for Fourier transform/inverse Fourier transform between the second-dimension time domain and the Doppler domain. The second-dimension time-domain result of channel estimation h[l, n'], l=1, 2, ..., $N_s$ of the echo signal at an n'-th sampling point is multiplied with the second window function sequence $w_1^2[n]$, n=1, 2, ..., $N_s$, to obtain the result of channel estimation after windowing of the second-dimension time domain of the echo signal at the n'-th sampling point, i.e., $h_{w1}^2[l', n]=h[l', n] \cdot w_1^2[n]$, n=1, 2, ..., $N_s$. Fourier transform of $N_s$ points is performed on the result of channel estimation $h_{w1}^2[l', n]$ after windowing of the second-dimension time domain of the echo signal, and the Doppler-domain result of channel estimation $H_{D\_wo}[m, n]$ after windowing can be obtained, where m=1, 2, ..., $N_s$, n=1, 2, ..., $N_{FFT}$. Windowing may also be performed in the second dimension by generating a second window function sequence $w_1^2[n]$, n=1, 2, ..., $N_s$ of the length $N_s$, and performing Fourier transform of $N_s$ points on the window function sequence to obtain the Doppler domain expression of the second window function sequence of the length $N_s$, i.e., $W_1^2[k]$, k=1, 2, ..., $N_s$. The second-dimension Doppler result of channel estimation of the echo signal at the n'-th sampling point, $H_D[m, n']$, m=1, 2, ..., $N_s$, is convolved with the Doppler domain expression of the second window function sequence, $W_1^2[m]$, m=1, 2, ..., $N_s$, to obtain the result of channel estimation after windowing of the second-dimension Doppler domain of the echo signal at the n'-th sampling point, i.e., $H_{D\_w1}[m, n']=H_D[m, n'] \circledast W_1^2[m]$, m=1, 2, ..., $N_s$. The result of channel estimation after second-dimension windowing of the $N_{FFT}$ echoes is obtained after the echo signals at $N_{FFT}$ sampling points are subjected to the above second-dimension processing. In the process of obtaining the windowed first-dimension and/or second-dimension result of channel estimations of the sensing node, the sequence of the first-dimension windowing and the second-dimension windowing of the sensing echo signal can be exchanged, and the window function of a corresponding dimension can be selected independently, because the signal processing in the two dimensions is independent of each other. Independently selecting window functions in the two dimensions increases flexibility of the window functions, and the same or different window functions can be selected for windowing according to system design and scene requirements. The windowing process using the window function in the first dimension and the second dimension at the same time may also be expressed by the frequency-domain result of channel estimation of the $N_s$ echo signals being expressed as a matrix $$H = \begin{bmatrix} H_{11} & \cdots & H_{1N_{FFT}} \\ \vdots & \ddots & \vdots \\ H_{N_s 1} & \cdots & H_{N_s N_{FFT}} \end{bmatrix},$$

where a matrix size is $N_s \times N_{FFT}$. Each row of H represents the result of channel estimation of a single sensing echo signal on a single OFDM symbol, and each column represents the result of channel estimation of the echo signal corresponding to a single sampling point. The first window function sequence of the length $N_{FFT}$ generated by the sensing node is expressed as a column vector $w^1=[w_1^1, w_2^1, \ldots, w_{N_{FFT}}^1]^T$, and the second window function sequence of the length $N_s$ is expressed as a vector $w^2=[w_1^2, w_2^2, \ldots, w_{N_s}^2]^T$. The result of channel estimation after windowing can be expressed as a matrix $H_w = FH \odot W_0^1 F^* \odot W_0^2$, where $\odot$ is Hadamard product operation, Fourier transform operation matrix $F =$ $$\begin{bmatrix} 1 & 1 & 1 & \cdots & 1 \\ 1 & \omega^{-1} & \omega^{-2} & \cdots & \omega^{-(N_{FFT}-1)} \\ 1 & \omega^{-2} & \omega^{-4} & \cdots & \omega^{-2(N_{FFT}-1)} \\ \vdots & \vdots & \vdots & \ddots & \vdots \\ 1 & \omega^{-(N_{FFT}-1)} & \omega^{-2(N_{FFT}-1)} & \cdots & \omega^{-(N_{FFT}-1)(N_{FFT}-1)} \end{bmatrix},$$

inverse Fourier transform operation matrix $F^* =$ $$\frac{1}{N_{FFT}} \begin{bmatrix} 1 & 1 & 1 & \cdots & 1 \\ 1 & \omega & \omega^2 & \cdots & \omega^{(N_{FFT}-1)} \\ 1 & \omega^2 & \omega^4 & \cdots & \omega^{2(N_{FFT}-1)} \\ \vdots & \vdots & \vdots & \ddots & \vdots \\ 1 & \omega^{(N_{FFT}-1)} & \omega^{2(N_{FFT}-1)} & \cdots & \omega^{(N_{FFT}-1)(N_{FFT}-1)} \end{bmatrix},$$ where $\omega = e^{\frac{2\pi i}{N_{FFT}}}$, the first-dimension window function matrix is $W_0^1=[w^1, w^1, \ldots, w^1]^T$, the matrix size is $N_s \times N_{FFT}$, and the second-dimension window function matrix is $W_0^2=[w^2, w^2, \ldots, w^2]$, and the matrix size is $N_s \times N_{FFT}$.

Returning to the method in FIG. 10, in step S1003, the sensing node obtains a combination of one or more of the number of sensing targets, the distance of the sensing target, and the velocity of the sensing target, through a threshold detection.

When the sensing node only receives a single sensing echo signal on a single OFDM symbol, a threshold detection by the sensing node based on the first-dimension time-domain result of channel estimation after windowing of the single echo may be that the time-domain result of channel estimation after windowing is compared with a power threshold. The number of maximum values greater than the power threshold is the number of detected sensing objects, and a distance between the sensing object and the sensing node can be calculated according to the sampling point corresponding to the maximum value. Specifically, the power threshold may be a fixed value or a real-time calculated value related to statistical characteristics of noise. For example, the sensing node obtains statistical characteristics such as a variance of the noise for power threshold calculation, and the way in which the sensing node obtains the noise may be to obtain the channel estimation in real time based on the echo signal, or to set a fixed noise variance according to an empirical value or a theoretical value. This power threshold design has a simple operation and low computational complexity. For example, assume that a fixed power threshold is $\delta$, the number of sensing signals transmitted by sensing node $N_s=1$, and the time-domain result of channel estimation after windowing is $h_{w1}[n]$, n=1, 2, ..., $N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. If $\forall n$, $h_{w1}[n] \leq \delta$, it is determined that there is no target in the sensing region; otherwise, among all $n_i$, i=1, 2, . . . , $K_1$ satisfying $h_{w1}[n] > \delta$, i=1, 2, . . . , $K_1$, a maximum value $h_{w1}[n_j] \in h_{w1}[n_i]$, i=1, 2, . . . , $K_1$ is searched, where a resolution unit corresponding to a j-th maximum value is $n_j$, j=1, 2, . . . , $K_2$, then the number of sensing targets is $K_2$. A resolution unit set corresponding to the maximum values searched in a single echo is denoted as $\xi = U_{i=1}^{K_2} n_j$, and elements in the set $\xi$ are the sampling points corresponding to all the sensing objects sensed from the received single echo. Then, according to a one-to-one corresponding relationship between the distance r between the sensing target and the sensing node and the sampling point n, the distance of all sensing targets can be calculated in Equation (19) as follows, $$r_i = \frac{n_i \cdot c}{2 \cdot F_s} \text{(in m)}, i = 1, 2, \ldots, K_2, \quad (19)$$

where c is the velocity of light (in m/s), and $F_s$ is the sampling rate in Hz.

When the sensing node receives multiple sensing echo signals on multiple OFDM symbols, the sensing node performs a first-level over-threshold detection and a second-level over-threshold detection successively according to the first-dimension and second-dimension result of channel estimations after windowing of the multiple echoes. The two-level threshold detection may be that the first-dimension time-domain result of channel estimation after windowing is compared with a first-level power threshold. Then, the number of maximum values greater than the power threshold is the number of detected sensing objects, and a distance between the sensing object and the sensing node can be calculated according to the sampling point corresponding to the maximum value. The second-dimension Doppler domain result of channel estimation after windowing is compared with a second-level power threshold, then the number of maximum values greater than the power threshold is the number of detected sensing targets, and according to the sampling point corresponding to the maximum value, the velocity of the sensing target relative to the sensing node can be obtained. Specifically, the power threshold may be a fixed value or a real-time calculated value related to statistical characteristics of noise. For example, the sensing node obtains statistical characteristics such as a variance of the noise for power threshold calculation, and the sensing node obtains the noise by obtaining the channel estimation in real time based on the echo signal, or to set a fixed noise variance according to an empirical value or a theoretical value. This power threshold design has a simple operation and low computational complexity. For example, assume that a fixed power threshold is $\delta_1$, the number of sensing signals transmitted by sensing node is $N_s$, and the time-domain result of channel estimation after windowing is $h_{w1}^1[l, n]$, n=1, 2, . . . , $N_{FFT}$, where $N_{FFT}$ is the number of sampling points of a single echo, and is also the length of the first-dimension time-domain/frequency-domain result of channel estimation, and the number of points of Fourier transform/inverse Fourier transform between the first-dimension time domain and frequency domain. If $\forall n$, $h_{w1}^1[l, n] \leq \delta_1$, it is determined that there is no target in the sensing region. Otherwise, among all $n_i$, i=1, 2, . . . , $K_1$ satisfying $h_{w1}^1[l, n_i] > \delta_1$, i=1, 2, . . . , $K_1$, a maximum value $h_{w1}[n_j] \in h_{w1}^1[l, n_i]$, i=1, 2, . . . , $K_1$ is searched, wherein a resolution unit corresponding to a j-th maximum value is $n_j$, j=1, 2, . . . , $K_2$, then the number of sensing targets is $K_2$. A resolution unit set corresponding to the maximum values searched in a single echo is denoted as $\xi = U_{i=1}^{K_2} n_j$, and elements in the set $\xi$ are the sampling points corresponding to all the sensing objects sensed from the received single echo. Then, according to a one-to-one corresponding relationship between the distance r between the sensing target and the sensing node and the sampling point n, the distance of all sensing targets can be calculated in Equation (20) as follows, $$r_i = \frac{n_i \cdot c}{2 \cdot F_s} \text{(in m)}, i = 1, 2, \ldots, K_2, \quad (20)$$

where c is the velocity of light (in m/s), and $F_s$ is the sampling rate in Hz. Then, the second-level power threshold detection is performed on the Doppler domain result of channel estimation after windowing $H_{D\_w1}[m, n_j]$, where $n_j$, j=1, 2, . . . , $K_2$ is a distance resolution unit of the first-dimension sensing target, and $K_2$ is the number of sensing targets. Assuming a fixed power threshold is $\delta_2$, among all $m_i$, i=1, 2, . . . , $K_1$, j=1, 2, . . . , $K_2$ satisfying $H_{D\_w1}[m_i, n_j] > \delta_2$, i=1, 2, . . . , $K_1$, a maximum value $H_{D\_w1}[m_g, n_j] \in H_{D\_w1}[m_i, n_j]$ is searched, where a Doppler frequency corresponding to the g-th maximum value is $m_g$, g=1, 2, . . . , $K_3$, then the number of sensing targets at the distance resolution unit $n_j$ is $K_3$. Then, according to a one-to-one corresponding relationship between the velocity v between the sensing target and the sensing node and the Doppler frequency m, the velocity of all sensing targets can be calculated in Equation (21) as follows, $$v_i = \frac{-(m_g - N_s - 1) \cdot PRF \cdot \lambda}{2 \cdot N_s \cdot PRT} \text{(in m/s)}, j = 1, 2, \ldots, K_g, \quad (21)$$

where PRT is a repeating cycle of the sensing signal, and $\lambda$ is a wavelength of the sensing signal in m.

Figure 11:
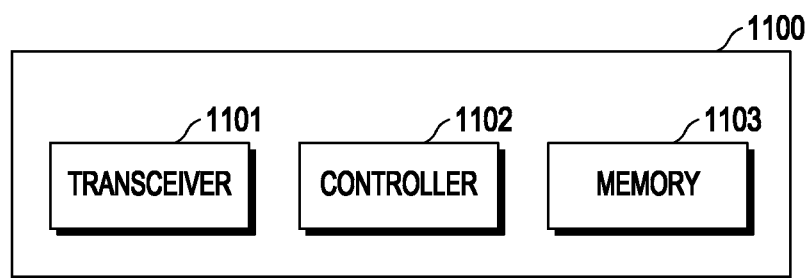
FIG. 11 illustrates a block diagram of an example node according to an embodiment.

FIG. 11 illustrates a block diagram of a node according to an embodiment.

Referring to FIG. 11, a node 1100 includes a transceiver 1101, a controller 1102 and a memory 1103. Under the control of the controller 1102 (which can be implemented as one or more processors), the node 1100 can be configured to perform related operations performed by node in the method described above. Although shown as separate entities, the transceiver 1101, the controller 1102 and the memory 1103 may be implemented as a single entity, such as a single chip. The transceiver 1101, the controller 1102, and the memory 1103 may be electrically connected or coupled to each other. The transceiver 1101 may transmit a signal to and receive a signal from other network entities, such as a node, or the transceiver 1101 may be omitted. In this case, the controller 1102 may be configured to execute instructions (including computer programs) stored in the memory 1103 to control the overall operation of the UE 1100, so as to implement the operations in the flow of the above method. In some implementations, the memory 1103 may also be omitted.

Those skilled in the art will appreciate that the present disclosure relates to devices for performing one or more of the operations described herein. These devices may be specially designed and manufactured for desired purposes, or may include known devices found in general purpose computers. These devices have computer programs stored therein that are selectively activated or reconfigured. Such a computer program may be stored in a device (e.g., computer) readable medium or in any type of medium suitable for storing electronic instructions and coupled to a bus, respectively. The computer-readable medium includes, but is not limited to, any type of disk (including floppy disk, hard disk, optical disk, compact disc (CD)-ROM, and magneto-optical disk), a ROM, a RAM, an erasable programmable read-only memory (EPROM), an electrically erasable programmable read-only memory (EEPROM), a flash disk, a magnetic card or an optical card. That is, the readable medium includes any medium that stores or transmits information in a form readable by a device (e.g., a computer).

Those skilled in the art will understand that computer program instructions can be used to implement each block in these structural diagrams and/or block diagrams and/or flow charts and combinations of blocks in these structural diagrams and/or block diagrams and/or flow charts. Those skilled in the art can understand that these computer program instructions can be provided to general-purpose computers, dedicated-purpose computers, or processors for programmable data processing methods to implement, so that the solutions specified in the block or blocks in the structural diagrams and/or block diagrams and/or flow charts disclosed in the present disclosure are executed by the computers or the other processors for programmable data processing methods.

Those skilled in the art can understand that various operations, methods, steps of the flows, measures, and solutions discussed in the present disclosure can be replaced, changed, combined, or deleted. Further, other steps, measures, and solutions in the various operations, methods, and flows that have been discussed in the present disclosure may also be replaced, changed, rearranged, decomposed, combined, or deleted. Further, steps, measures, and solutions of the various operations, methods, and flows disclosed in the present disclosure and existing in the prior art can also be alternated, changed, rearranged, decomposed, combined, or deleted.

While the disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a first node in a wireless communication system, the method comprising:
    performing channel estimation on an echo signal of a first signal transmitted by the first node;
    determining a first filter based on a result of the channel estimation and a distance between the first node and a target; and
    performing a first filtering process on the result of channel estimation based on the first filter.

2. The method of claim 1, wherein, determining the first filter further comprises:
    determining a maximum main lobe power of the echo signal based on the result of channel estimation; and
    determining the first filter based on the maximum main lobe power and noise power.

3. The method of claim 1, wherein, determining the first filter further comprises:
    determining a maximum main lobe power of the echo signal, a first distance between the first node and a first target corresponding to the maximum main lobe power, a minimum main lobe power of the echo signal, and a second distance between the first node and a second target corresponding to the minimum main lobe power, based on the result of channel estimation; and
    determining the first filter, based on the maximum main lobe power, the first distance, the minimum main lobe power, the second distance, and the noise power.

4. The method of claim 1, wherein the distance between the first node and the target is determined based on the result of channel estimation or is received from a second node.

5. The method of claim 4, further comprising transmitting, to the second node, a distance between the second node and the target,
    wherein different distances correspond to different filters, or a plurality of the different distances correspond to a same filter.

6. The method of claim 4, further comprising obtaining a first target detection result of the first node based on the result of channel estimation after the first filtering process;
    performing a second filtering process on the result of channel estimation based on a filter used by the first node in at least one previous sensing cycle; and
    in a case that a second result of channel estimation after the second filtering process and a first result of channel estimation after the first filtering process in the at least one previous sensing cycle satisfy a first condition, determining the first filter based on the result of channel estimation and the distance between the first node and the target.

7. The method of claim 6, further comprising:
    receiving, from the second node, third configuration information for configuring a sensing cycle of the first node; and
    transmitting, to the second node, fourth configuration information for configuring a sensing cycle of the second node.

8. The method of claim 2, wherein the noise power is preconfigured or is estimated based on a received signal of the first node comprising an echo signal.

9. The method of claim 8, wherein, determining a second filter comprises:
    performing a third filtering process on the result of channel estimation by using the second filter; and
    determining the second filter based on the result of channel estimation after the third filtering process and the distance between the first node and the target.

10. The method of claim 6, further comprising transmitting, to the second node, the first target detection result of the first node,
    wherein, the first node and the second node are one of a terminal, a base station and a road side unit.

11. A first node in a wireless communication system, the first node comprising:
    a transceiver; and
    at least one processor coupled to the transceiver and configured to:
    perform channel estimation on an echo signal of a first signal transmitted by the first node,
    determine a first filter based on a result of the channel estimation and a distance between the first node and a target, and
    perform a first filtering process on the result of channel estimation based on the first filter.

12. The first node of claim 11, wherein at least one processor is further configured to:
    determine a maximum main lobe power of the echo signal based on the result of channel estimation, and determine the first filter based on the maximum main lobe power and noise power.

13. The first node of claim 11, wherein, at least one processor is further configured to:
   determine a maximum main lobe power of the echo signal, a first distance between the first node and a first target corresponding to the maximum main lobe power, a minimum main lobe power of the echo signal, and a second distance between the first node and a second target corresponding to the minimum main lobe power, based on the result of channel estimation; and
   determine the first filter, based on the maximum main lobe power, the first distance, the minimum main lobe power, the second distance, and the noise power.

14. The first node of claim 11, wherein the distance between the first node and the target is determined based on the result of channel estimation or is received from a second node.

15. The first node of claim 14, wherein at least one processor is further configured to transmit, to the second node, a distance between the second node and the target, and
   wherein different distances correspond to different filters, or a plurality of the different distances correspond to a same filter.

16. The first node of claim 14, wherein at least one processor is further configured to:
   obtain a first target detection result of the first node based on the result of channel estimation after the first filtering process,
   perform a second filtering process on the result of channel estimation based on a filter used by the first node in at least one previous sensing cycle, and
   in a case that a second result of channel estimation after the second filtering process and a first result of channel estimation after the first filtering process in the at least one previous sensing cycle satisfy a first condition, determine the first filter based on the result of channel estimation and the distance between the first node and the target.

17. The first node of claim 16, wherein at least one processor is further configured to:
   receive, from the second node, third configuration information for configuring a sensing cycle of the first node, and
   transmit, to the second node, fourth configuration information for configuring a sensing cycle of the second node.

18. The first node of claim 12, wherein the noise power is preconfigured or is estimated based on a received signal of the first node comprising an echo signal.

19. The first node of claim 18, wherein at least one processor is further configured to:
   perform a third filtering process on the result of channel estimation by using the second filter and
   determine the second filter based on the result of channel estimation after the third filtering process and the distance between the first node and the target.

20. The first node of claim 16, wherein at least one processor is further configured to transmit, to the second node, the first target detection result of the first node, and
   wherein, the first node and the second node are one of a terminal, a base station and a road side unit.

* * * * *